(12) United States Patent
Hirate

(10) Patent No.: US 8,738,366 B2
(45) Date of Patent: *May 27, 2014

(54) RELATED-WORD REGISTRATION DEVICE, INFORMATION PROCESSING DEVICE, RELATED-WORD REGISTRATION METHOD, PROGRAM FOR RELATED-WORD REGISTRATION DEVICE, AND RECORDING MEDIUM

(71) Applicant: Rakuten, Inc., Tokyo (JP)

(72) Inventor: Yu Hirate, Tokyo (JP)

(73) Assignee: Rakuten, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/923,744

(22) Filed: Jun. 21, 2013

(65) Prior Publication Data

US 2013/0346391 A1 Dec. 26, 2013

Related U.S. Application Data

(62) Division of application No. 13/884,344, filed as application No. PCT/JP2011/075572 on Nov. 7, 2011.

(30) Foreign Application Priority Data

Nov. 10, 2010 (JP) ................................. 2010-252325
Nov. 10, 2010 (JP) ................................. 2010-252326

(51) Int. Cl.
 *G06F 17/27* (2006.01)
 *G06F 17/28* (2006.01)
 *G06F 17/21* (2006.01)
 *G10L 15/04* (2013.01)
 *G10L 21/00* (2013.01)

(52) U.S. Cl.
 USPC ...... 704/9; 704/4; 704/10; 704/251; 704/270; 704/270.1; 704/275

(58) Field of Classification Search
 USPC ................. 704/4, 9, 10, 251, 270, 270.1, 275
 See application file for complete search history.

(56) References Cited

U.S. PATENT DOCUMENTS 6,169,986 B1 1/2001 Bowman et al.
6,741,959 B1 * 5/2004 Kaiser ................................. 704/7

(Continued)

FOREIGN PATENT DOCUMENTS

| JP | 2000-268035 A | 9/2000 |
| JP | 2010-231433 A | 10/2010 |
| JP | 5101759 B2 | 12/2012 |

OTHER PUBLICATIONS

Yu Hirate et al., "Keyword Correction Algorithm in Keyword Based Search Engine", Dai 2 Kai Forum on Data Engineering and Information Management—DEIM 2010—Ronbunshu, Jun. 2010, pp. 1-8, DEIM Forum 2010, B2-4.

(Continued)

*Primary Examiner* — Edgar Guerra-Erazo
(74) *Attorney, Agent, or Firm* — Sughrue Mion, PLLC

(57) ABSTRACT

A search query of a search word entered by the user is received, the received search queries are stored in accordance with reception order, a preceding search query whose reception order is earlier than that of the received search query is extracted on the basis of a preset search query extracting condition, a preceding search word constructing the extracted preceding search query and a search word constructing the received search query are stored as a character string set, a character string set having the search word which is the same or similar to the preceding search word is extracted in accordance with a preset character string set extraction start condition (S51), a character set as a related word is specified from the extracted character string set on the basis of a preset registration condition (S53), and the specified character string set is registered as related words into a related-word database (S54).

10 Claims, 16 Drawing Sheets

(56) References Cited

U.S. PATENT DOCUMENTS

| | | |
|---|---|---|
| 7,885,963 B2 * | 2/2011 | Sanders .................... 707/750 |
| 2002/0042792 A1 * | 4/2002 | Nishioka et al. ................. 707/5 |
| 2002/0178153 A1 * | 11/2002 | Nishioka et al. ................. 707/3 |
| 2003/0033297 A1 * | 2/2003 | Ogawa ............................ 707/3 |
| 2003/0200211 A1 * | 10/2003 | Tada et al. ....................... 707/5 |
| 2004/0111404 A1 * | 6/2004 | Mano et al. ..................... 707/3 |
| 2004/0139054 A1 * | 7/2004 | Kindo et al. ..................... 707/1 |
| 2005/0033711 A1 * | 2/2005 | Horvitz et al. ................. 706/50 |
| 2005/0055210 A1 * | 3/2005 | Venkataraman et al. ..... 704/255 |
| 2006/0253427 A1 | 11/2006 | Wu et al. |
| 2007/0185862 A1 * | 8/2007 | Budzik et al. ................... 707/5 |
| 2010/0145678 A1 * | 6/2010 | Csomai et al. ................... 704/9 |

OTHER PUBLICATIONS

International Search Report for PCT/JP2011/075572 dated Dec. 6, 2011.

\* cited by examiner ately generates a related-word candidate group by extracting candidates of a related word on the basis of a predetermined condition from a search query log in which logs regarding a search query are stored; a receiving means that receives a search query of a search word entered by the user; a partial character string generating means that generates a partial character string from a character string of the search word; a candidate character string extracting means that extracts a candidate character string from the related-word candidate group on the basis of the generated partial character string; a score calculating means that calculates a suitability score of the candidate character string on the basis of similarity between the candidate character string and the search word, the number of use times of the candidate character string, and the number of search results of the search of the candidate character string; a ranking means that ranks the candidate character strings in order of the scores; a criterion generating means that generates a reference line of a suitability score for the ranking as a criterion of determining whether the candidate character string is registered as a related word or not on the basis of the suitability score and the ranking of the candidate character string; a registration character string extracting means that extracts, as a registration character string to be registered as a related word, a candidate character string whose suitability score is apart from the reference line by a preset threshold or larger; and a related-word registering means that registers the extracted registration character string and the search word as related words into a related-word database.

RELATED-WORD REGISTRATION DEVICE, INFORMATION PROCESSING DEVICE, RELATED-WORD REGISTRATION METHOD, PROGRAM FOR RELATED-WORD REGISTRATION DEVICE, AND RECORDING MEDIUM

CROSS-REFERENCE TO RELATED APPLICATION

This is a Divisional Application of U.S. application Ser. No. 13/884,344 filed May 9, 2013, which is a National Stage of International Application No. PCT/JP2011/075572 filed Nov. 7, 2011, and which claims priority from Japanese Patent Application Nos. 2010-252325 and 2010-252326 filed Nov. 10, 2010 and Nov. 10, 2010, respectively. The entire disclosures of the prior applications are incorporated herein by reference in their entity.

TECHNICAL FIELD

The present invention relates to a technical field of a related-word registration device, an information processing device, a related-word registration method, a program for a related-word registration device, and a recording medium for registering a search keyword as a related word.

BACKGROUND ART

A database of words such as a synonym dictionary is used to increase precision of supplement of a search keyword, translation, and the like in an information search system, a natural language processing system, a machine translation system, and the like. Various devices for automatically constituting a synonym dictionary are being studied. For example, patent document 1 discloses a semantic dictionary registration device for automatically providing semantic information to an input dictionary entry by using information of a dictionary entry to which semantic information is already provided in a semantic dictionary.

CITATION LIST

Patent Document

Patent Document 1: JP 2000-268035 A

SUMMARY OF THE INVENTION

Problem to be Solved by the Invention

In the technique disclosed in the patent document 1, however, since a synonym is determined on the basis of semantic distance between simple words of input data and words of all of registered data, the precision of determination of a synonym is low, and registration of a related word such as an unnecessary synonym cannot be suppressed. It is therefore difficult to build a high-precision related-word dictionary such as a synonym dictionary.

The present invention is achieved in view of such a problem, and an example of an object is to provide a related-word registration device and the like capable of registering a high-precision related word.

Means for Solving the Problem

In order to solve the above problem, one exemplary embodiment includes: a related-word candidate group gener- Another exemplary embodiment is characterized in that, in the related-word registration device, the partial character string generation means sets length of a partial character string on the basis of the number of characters of the search word and generates a partial character string having the set length.

Another exemplary embodiment is characterized in that, in the related-word registration device, the partial character string generating means sets shift width of the number of characters of a search word at the time of generating a partial character string on the basis of the number of characters of the search word and generates a partial character string with the set shift width.

Another exemplary embodiment is characterized in that, in the related-word registration device, the partial character string generating means generates the partial character string for a search word obtained by phonogram converting the search word.

Another exemplary embodiment is characterized in that the related-word registration device further includes a parameter adjusting means that adjusts information of the similarity and the number of use times of the score calculating means.

Another exemplary embodiment is characterized in that, in the related-word registration device, the criterion generating means obtains the reference line by an approximate function which approximates relation between the ranking and the suitability score or data of the raking in a predetermined range.

Another exemplary embodiment is characterized in that, in the related-word registration device, the registration character string extracting means sets an upper limit to the number of registration character strings extracted.

Another exemplary embodiment is characterized in that the related-word registration device further includes a search word storing means that stores a search word related to a product which is being sold in an internal or external EC site.

Another exemplary embodiment is characterized in that, in the related-word registration device, the score calculating means calculates the suitability score on the basis of data of a log on the search query.

Another exemplary embodiment is characterized in that the related-word registration device further includes: a search query storing means that stores the received search queries in accordance with reception order; a search query extracting means that extracts, from the search query storing means, a preceding search query whose reception order is earlier than that of the received search query on the basis of a preset search query extracting condition; a character string group storing means that stores, as a character string set, a preceding search word constructing the extracted preceding search query and a search word constructing the received search query; a character string extracting means that extracts a character string set having the search word which is the same or similar to the preceding search word from the character string set storing means in accordance with a preset character string set extraction start condition; and a related-word specifying means that specifies a character set as a related word from the extracted character string set on the basis of a preset registration condition, wherein the related-word registering means registers the specified character string set as related words into a related-word database.

Another exemplary embodiment is characterized in that, in the related-word registration device, the search query storing means further stores user identification information, and the search query extracting means extracts the preceding search query whose user identification information matches that of the user who entered the search query as the search query extraction condition.

Another exemplary embodiment is characterized in that, in the related-word registration device, the search query extracting means extracts a preceding search query received within predetermined time since received time of the search query as the search query extraction condition.

Another exemplary embodiment is characterized in that, in the related-word registration device, the search query storing means further stores category information, and the search query extracting means extracts the preceding search query on the basis of the category information as the search query extraction condition.

Another exemplary embodiment is characterized in that, in the related-word registration device, the character string extracting means extracts the character string set in the case where the number of search queries in the search query storing means or the number of elements of the character string set group exceeds a predetermined threshold as the character string set extraction start condition.

Another exemplary embodiment is characterized in that, in the related-word registration device, the character string extracting means extracts the character string set in the case where predetermined time lapses since the character string set extraction start condition is satisfied.

Another exemplary embodiment is characterized in that, in the related-word registration device, in the case where the number of character string sets having the same or similar search word or the ratio of character string sets having the same or similar search word exceeds a predetermined threshold in character string sets having the same or similar preceding search word as the registration condition, the related-word specifying means specifies the character string set as related words.

Another exemplary embodiment relates to an information processing device for processing information with reference to a related-word database of the related-word registration device, including: a related-word extracting means that extracts a related word corresponding to a search word of the received search query with reference to the related-word database; and a related-word output means that outputs the related word extracted by the related-word extracting means.

Another exemplary embodiment relates to a related-word registration method of a related-word registration device for registering a related word, including: a related-word candidate group generating step of generating a related-word candidate group by extracting candidates of a related word on the basis of a predetermined condition from a search query log in which logs regarding a search query are stored; a receiving step of receiving a search query of a search word entered by the user; a partial character string generating step of generating a partial character string from a character string of the search word; a candidate character string extracting step of extracting a candidate character string from the related-word candidate group on the basis of the generated partial character string; a score calculating step of calculating a suitability score of the candidate character string on the basis of similarity between the candidate character string and the search word, the number of use times of the candidate character string, and the number of search results of the search of the candidate character string; a ranking step of ranking the candidate character strings in order of the scores; a criterion generating step of generating a reference line of a suitability score for the ranking as a criterion of determining whether the candidate character string is registered as a related word or not on the basis of the suitability score and the ranking of the candidate character string; a registration character string extracting step of extracting, as a registration character string to be registered as a related word, a candidate character string whose suitability score is apart from the reference line by a preset threshold or larger; and a related-word registering step of registering the extracted registration character string and the search word as related words into a related-word database.

Another exemplary embodiment makes a computer function as: a related-word candidate group generating means that generates a related-word candidate group by extracting candidates of a related word on the basis of a predetermined condition from a search query log in which logs regarding a search query are stored; a receiving means that receives a search query of a search word entered by the user; a partial character string generating means that generates a partial character string from a character string of the search word; a candidate character string extracting means that extracts a candidate character string from the related-word candidate group on the basis of the generated partial character string; a score calculating means that calculates a suitability score of the candidate character string on the basis of similarity between the candidate character string and the search word, the number of use times of the candidate character string, and the number of search results of the search of the candidate character string; a ranking means that ranks the candidate character strings in order of the scores; a criterion generating means that generates a reference line of a suitability score for the ranking as a criterion of determining whether the candidate character string is registered as a related word or not on the basis of the suitability score and the ranking of the candidate character string; a registration character string extracting means that extracts, as a registration character string to be registered as a related word, a candidate character string whose suitability score is apart from the reference line by a preset threshold or larger; and a related-word registering means that registers the extracted registration character string and the search word as related words into a related-word database.

Another exemplary embodiment stores a program for a related-word registration device, for making a computer function as: a related-word candidate group generating means that generates a related-word candidate group by extracting candidates of a related word on the basis of a predetermined condition from a search query log in which logs regarding a search query are stored; a receiving means that receives a search query of a search word entered by the user; a partial character string generating means that generates a partial character string from a character string of the search word; a candidate character string extracting means that extracts a candidate character string from the related-word candidate group on the basis of the generated partial character string; a score calculating means that calculates a suitability score of the candidate character string on the basis of similarity between the candidate character string and the search word, the number of use times of the candidate character string, and the number of search results of the search of the candidate character string; a ranking means that ranks the candidate character strings in order of the scores; a criterion generating means that generates a reference line of a suitability score for the ranking as a criterion of determining whether the candidate character string is registered as a related word or not on the basis of the suitability score and the ranking of the candidate character string; a registration character string extracting means that extracts, as a registration character string to be registered as a related word, a candidate character string whose suitability score is apart from the reference line by a preset threshold or larger; and a related-word registering means that registers the extracted registration character string and the search word as related words into a related-word database.

Effect of the Invention

According to an aspect of a preferred embodiment, a related-word candidate group obtained by extracting candidates of a related word on the basis of a predetermined condition from a search query log in which logs regarding a search query are stored is generated, a search query of a search word entered by the user is received, a partial character string is generated from a character string of the search word, a candidate character string is extracted from the related-word candidate group on the basis of the partial character strings, a suitability score of the candidate character string is calculated on the basis of similarity between the candidate character string and the search word, the number of use times of the candidate character string, and the number of search results of the search of the candidate character string, the candidate character strings are ranked in order of the scores, a reference line of a suitability score for the ranking is generated as a criterion of determining whether the candidate character string is registered as a related word or not on the basis of the suitability score and the ranking of the candidate character string, a candidate character string whose suitability score is apart from the reference line by a preset threshold or larger is extracted as a registration character string to be registered as a related word, and the extracted registration character string and the search word are registered as related words into the related-word database. Consequently, since a candidate character string is extracted from the related-word candidate group on the basis of a partial character string having a smaller number of characters, registration of an unnecessary related word can be suppressed by the suitability score of the candidate character string. Thus, the precision of a related word can be improved.

MODES FOR CARRYING OUT THE INVENTION

Hereinafter, embodiments of the present invention will be described with reference to the drawings. The embodiments to be described relate to the case of applying the present invention to a related-word registration system.

[1. Summary of Configurations and Functions of Related-Word Registration System]

First, the configuration and schematic functions of a related-word registration system according to an embodiment of the present invention will be described using FIG. 1.

Figure 1:
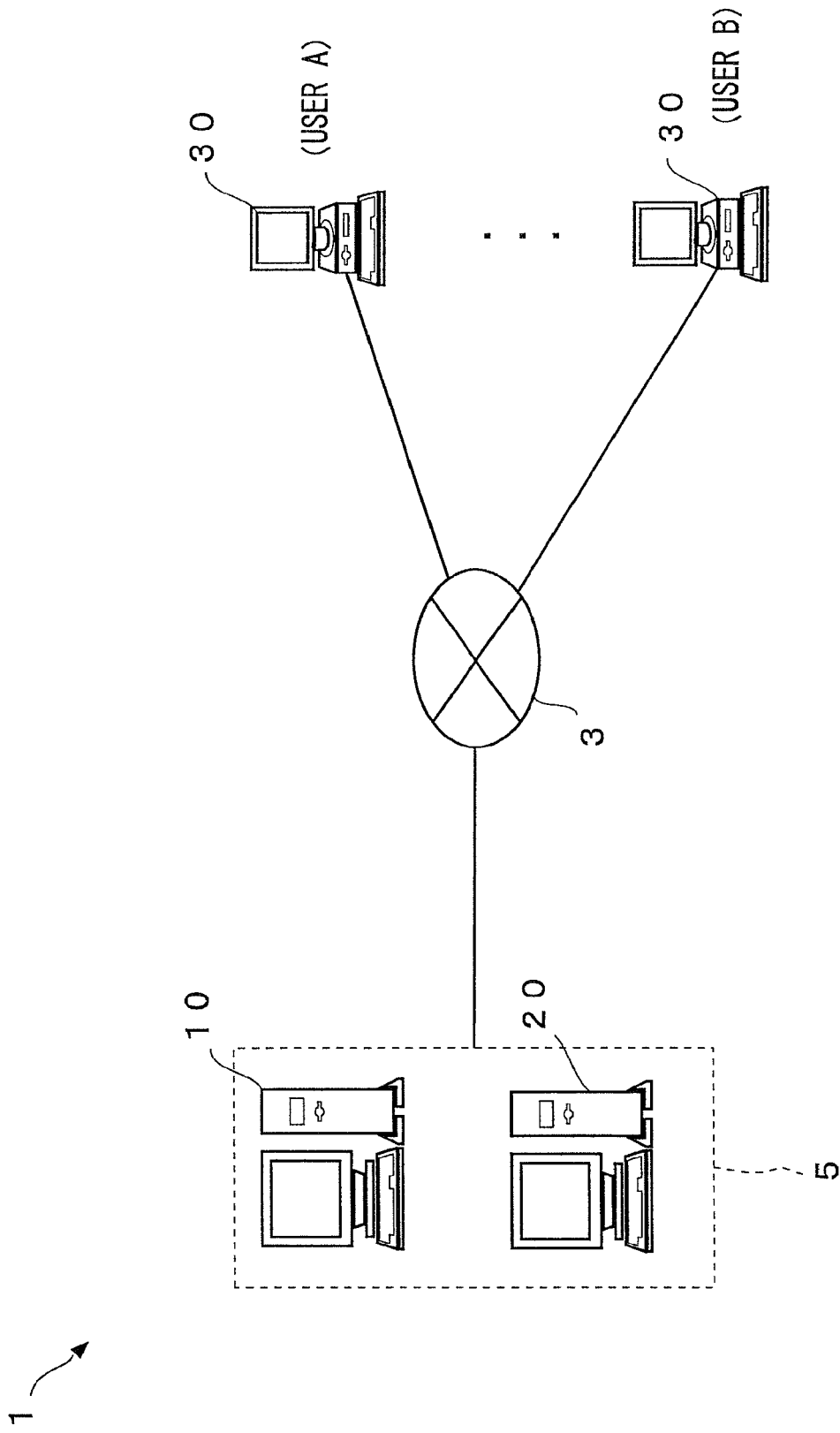
FIG. 1 is a schematic diagram illustrating an example of a schematic configuration of a related-word registration system as an embodiment of the present invention.

FIG. 1 is a schematic diagram illustrating an example of a schematic configuration of a related-word registration system 1 as an embodiment.

As illustrated in FIG. 1, the related-word registration system 1 includes: a related-word registration server 10 (an example of a related-word registration device) which registers a related word; an information providing server 20 installed to run a shopping site (an example of an internal EC (Electronic Commerce) site) as an example of an information providing site used by the user and for providing information registered in the related-word registration server 10 and information of products to the user; and a terminal 30 used by the user to retrieve a product and the like in the information providing server 20.

The related-word registration server 10 and the information providing server 20 are connected to each other via a local area network or the like so that data can be transmitted/received, and constitute a server system 5. The server system 5 and the terminal 30 are connected to each other via a network 3 and can transmit/receive data to/from each other by a communication protocol (such as TCP/IP). In addition, the network 3 is constructed by, for example, the internet, dedicated communication lines (for example, a CATV (Community Antenna Television) line), a mobile communication network (including a base station and the like), a gateway, and the like.

The related-word registration server 10 builds a database of related words from search activities and the like of the user in the terminal 30 and the like and supports the search activities of the user in the terminal 30 and the like.

The information providing server 20 receives a search query including a search word from the terminal 30, performs a search, and transmits a search result to the terminal 30. The information providing server 20 transmits a received search query to the related-word registration server 10 in order to build a database of related words. The information providing server 20 performs, as a shopping site, a search for a product, provision of information of products, provision of advertisement information, procedure for purchasing a product, and the like.

A plurality of terminals 30 of users exist.

[2. Configurations and Functions of Servers]

(2.1 Configurations and Functions of Related-Word Registration Server 10)

The configurations and functions of the related-word registration server 10 will be described using FIG. 2.

Figure 2:
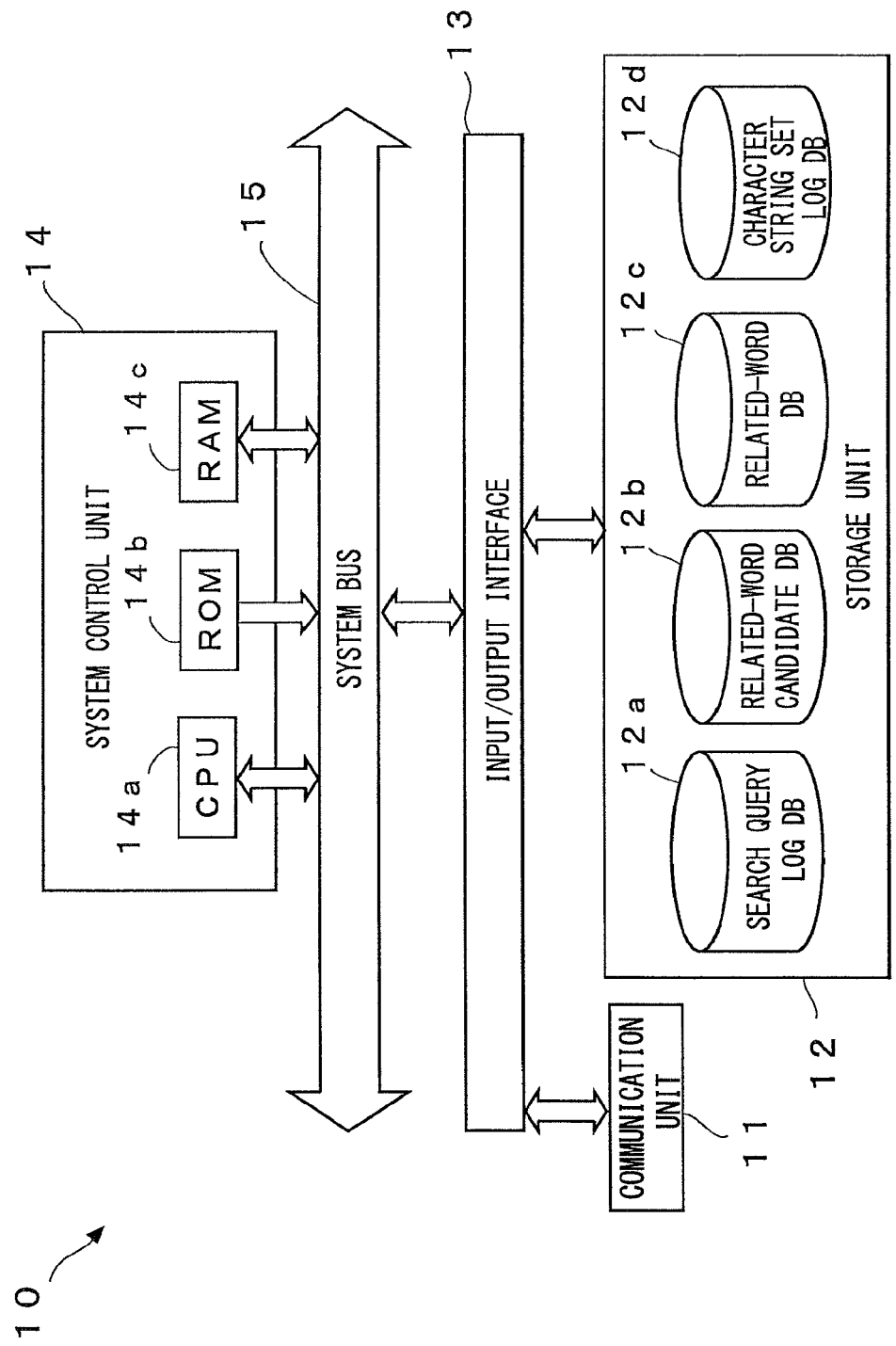
FIG. 2 is a block diagram illustrating an example of a schematic configuration of a related-word registration server in FIG. 1.

FIG. 2 is a block diagram illustrating an example of a schematic configuration of the related-word registration server 10.

As illustrated in FIG. 2, the related-word registration server 10 functioning as a computer has a communication unit 11, a storage unit 12, an input/output interface 13, and a system control unit 14. The system control unit 14 and the input/output interface 13 are connected to each other via a system bus 15.

The communication unit 11 is connected to the network 3 to control the state of communication with the terminal 30 or the like and, further, connected to the local area network to transmit/receive data to/from another server such as the information providing server 20 on the local area network.

The storage unit 12 is constructed by, for example, a hard disk drive or the like and stores various programs such as an operating system and a server program, data, and the like. In addition, the various programs may be obtained, for example, from another server device or the like via the network 3 or recorded in a recording medium and read via a drive device (not illustrated).

In the storage unit 12, a search query log database 12a (hereinbelow, called "search query log DB 12a") storing a log regarding a search query received from the terminal 30, a related-word candidate database 12b (hereinbelow, called "related-word candidate DB 12b") storing, as a related-word candidate group, candidate character strings of a related word generated from the search query, a related-word database 12c (hereinbelow, called "related-word DB 12c") storing a related word generated from the search query, a character string set database 12d (hereinbelow, called "character string set DB 12d"), and the like are built. In addition, the search query log DB 12a, the related-word candidate DB 12b, the related-word DB 12c, and the character string set DB 12d may be constructed in another server other than the related-word registration server 10 in the server system 5 or may be constructed on the outside of the server system 5.

In the search query log DB 12a (an example of a search query storing means), a search query associated with received time of a search query and user identification information for discriminating a user such as a user ID is stored. In addition, the user identification information includes a user ID of a shopping site or the like, identification number of a user terminal or an access point, IP address, and the like. Further, when the user makes a product search in the information providing server 20, a search query is stored in the search query log DB 12a in association with category information such as a product category to which the product belongs or a product category displayed in a web page opened by the user.

In the related-word candidate DB 12b, candidate character strings of the related word extracted on the basis of a predetermined condition from the search query log in the search query log DB 12a are stored as a related-word candidate group.

In the related-word DB 12c, a related word generated by the related-word registration server 10 is stored.

In the character string set DB 12d (an example of a character string set storing means), a character string set of a search word in the received search query and a search word of the search query extracted from the search query log DB 12a is stored.

Next, the input/output interface 13 performs interface process between the communication unit 11 and the storage unit 12 and the system control unit 14.

The system control unit 14 is constructed by a CPU (Central Processing Unit) 14a, a ROM (Read Only Memory) 14b, a RAM (Random Access Memory) 14c, and the like. The system control unit 14 reads and executes various programs stored in the ROM 14b and the storage unit 12 by the CPU 14a to perform a related-word registering process and the like.

(2.2 Configurations and Functions of Information Providing Server 20)

Next, the configurations and functions of the information providing server 20 will be described using FIG. 3.

Figure 3:
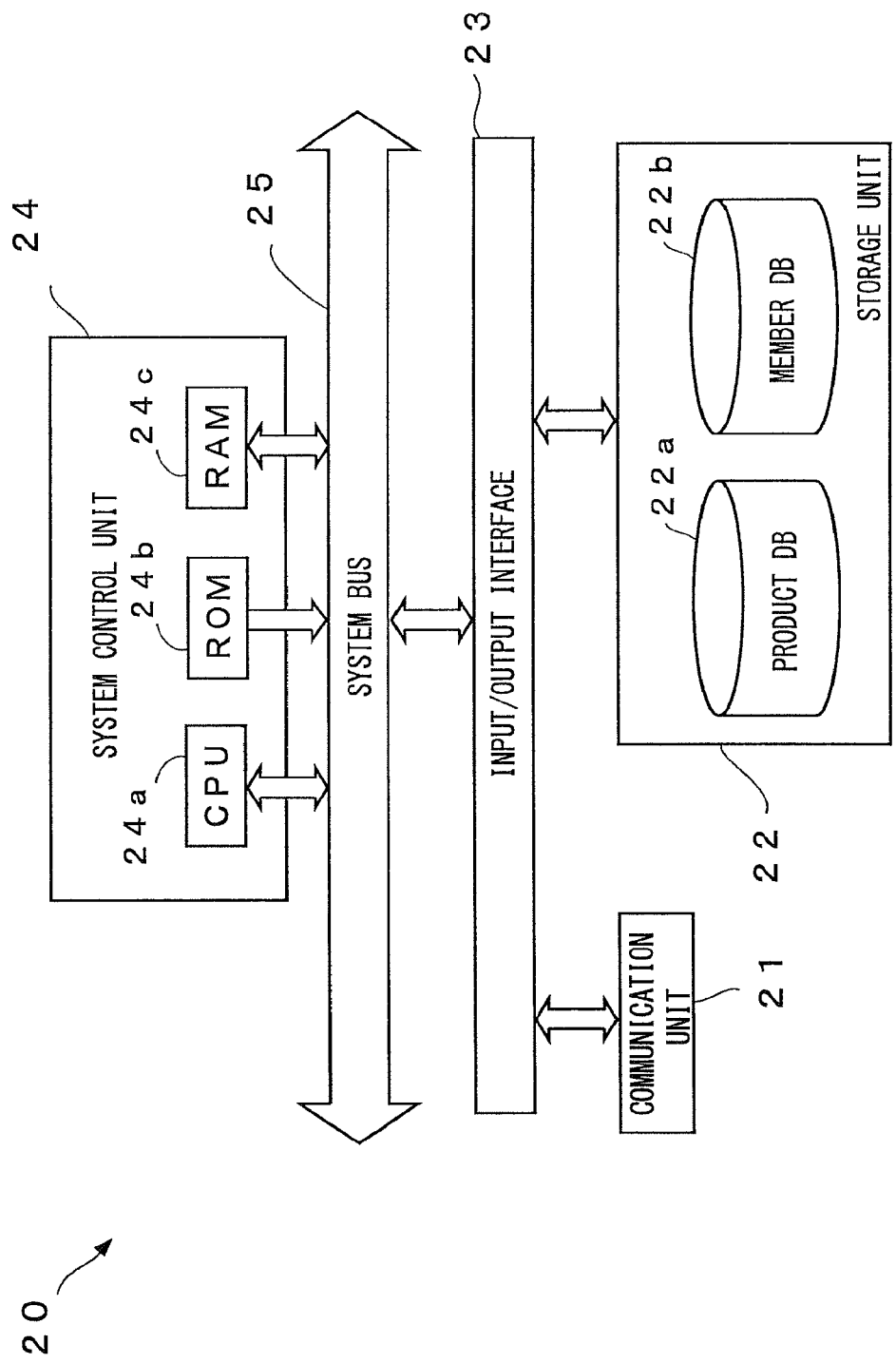
FIG. 3 is a block diagram illustrating an example of a schematic configuration of an information providing server in FIG. 1.

FIG. 3 is a block diagram illustrating an example of a schematic configuration of the information providing server 20.

As illustrated in FIG. 3, the information providing server 20 has a communication unit 21, a storage unit 22, an input/output interface 23, and a system control unit 24. The system control unit 24 and the input/output interface 23 are connected to each other via a system bus 25. In addition, since the configurations and functions of the information providing server 20 are almost the same as those of the related-word registration server 10, different things in the configurations and functions of the related-word registration server 10 will be mainly described.

The communication unit 21 controls the state of communication with the terminal 30, the related-word registration server 10, and the like via the network 3, the local area network, or the like.

In the storage unit 22, a product database (hereinbelow, called "product DB") 22a, a member database (hereinbelow, called "member DB") 22b, and the like are built.

In the product DB 22a, in association with a product ID as an identifier for identifying a product, the name and kind of the product, an image of the product, specifications, and product information, advertisement information related to each of the products, and the like are stored. In the product DB 22*a*, a file of a product web page described in a markup language such as HTML (Hyper Text Markup Language), an XML (Extensible Markup Language), or the like is stored.

Further, in the product DB 22*a*, a search database for retrieving a product is constructed. The product DB 22*a* is an example of a search word storing means that stores a search word related to a product being sold in an EC site in the server system 5.

In the member DB 22*b*, user information such as the user ID of a user registered as a member (user of a shopping site), name, address, telephone number, mail address, occupation, hobbies, purchase history, themes and genres (product categories) in which the user is interested, and the like is registered. In the member DB 22*b*, the user ID, log-in ID, and password necessary for the user to log in the shopping site from the terminal 30 are registered. Here, the log-in ID and password are log-in information used for log-in process (user authentication process).

The system control unit 24 includes a CPU 24*a*, a ROM 24*b*, and a RAM 24*c*. The system control unit 24 reads and executes various programs stored in the ROM 24*b* and the storage unit 22 by the CPU 24*a* to perform product searching process, product purchasing process by the user, and the like.

(2.3 Configurations and Functions of Terminal 30)

The configurations and functions of the terminal 30 will be described using FIG. 4.

Figure 4:
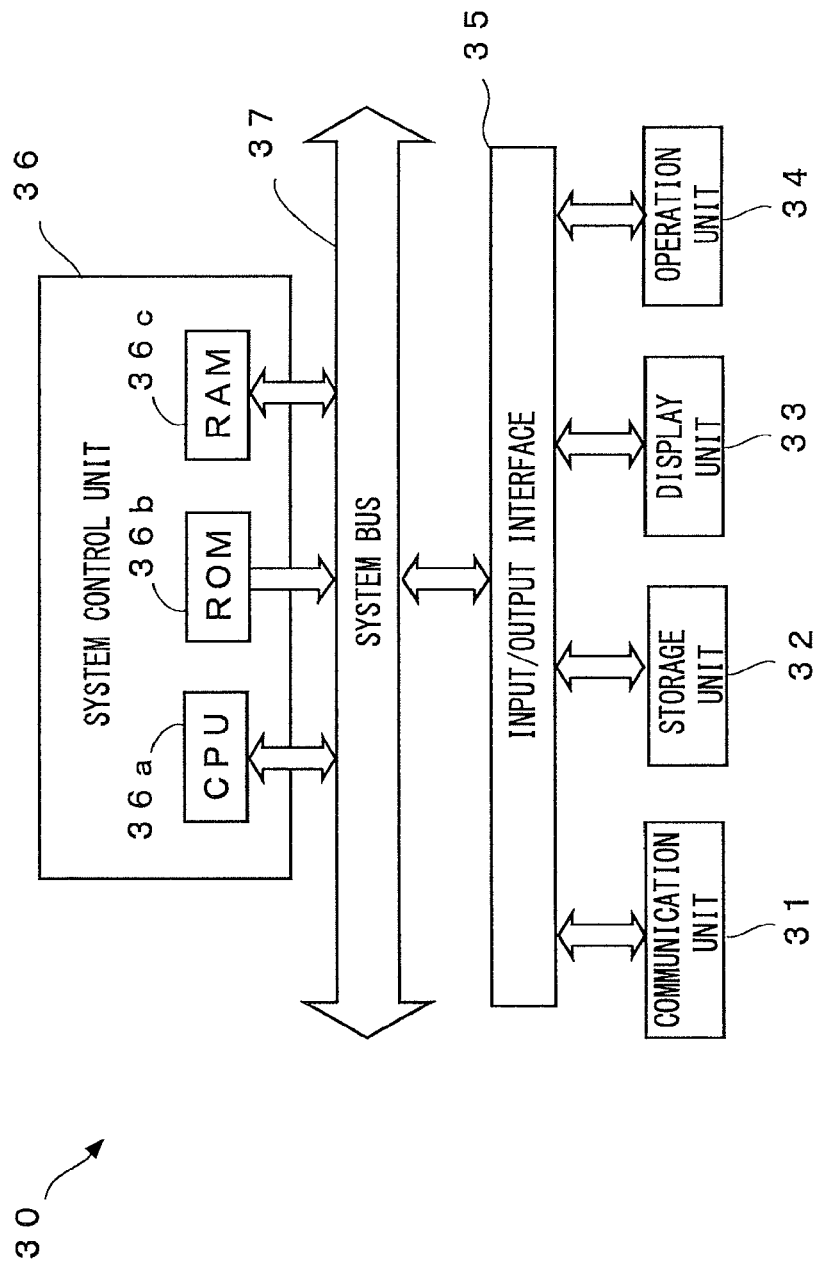
FIG. 4 is a block diagram illustrating an example of a schematic configuration of a terminal in FIG. 1.

FIG. 4 is a block diagram illustrating an example of the schematic configuration of the terminal 30.

As illustrated in FIG. 4, the terminal 30 functioning as a computer is, for example, a personal computer or a portable terminal such as a portable wireless telephone including a smartphone or a PDA and has a communication unit 31, a storage unit 32, a display unit 33, an operation unit 34, an input/output interface 35, and a system control unit 36. The system control unit 36 and the input/output interface 35 are connected to each other via a system bus 37.

The communication unit 31 controls communication with the information providing server 20 or the like via the network 3. In addition, in the case where the terminal 30 is a portable terminal device, the communication unit 31 has a wireless communication function for connection to the mobile communication network in the network 3.

The storage unit 32 is, for example, a hard disk drive or the like and stores an operating system, a program of a web browser, a program of a tool bar for the web browser, and the like.

The display unit 33 is constructed by, for example, a liquid crystal display device, an EL (Electro Luminescence) device, or the like. In the display unit 33, a web page of a search screen or a web page showing a result of a product search provided by the information providing server 20 is displayed by the web browser.

The operation unit 34 is constructed by, for example, a keyboard, a mouse, and the like. The user enters a response with the operation unit 34. In addition, in the case where the display unit 33 is a display panel of a touch switch system such as a touch panel, the operation unit 34 obtains position information of the display unit 33 of a position where the user touched or approached.

The input/output interface 35 is an interface between the communication unit 31 and the storage unit 32 and the system control unit 36.

The system control unit 36 includes, for example, a CPU 36*a*, a ROM 36*b*, and a RAM 36*c*. The system control unit 36 reads and executes various programs stored in the ROM 36*b*, the RAM 36*c*, and the storage unit 32 by the CPU 36*a*. For example, the system control unit 36 executes a program of a web browser and functions as a web browser.

[3. Operation of First Embodiment in Related-Word Registration System]

Next, the operation of the first embodiment in the related-word registration system 1 according to an embodiment of the present invention will be described using FIGS. 5 to 11.

Figure 5:
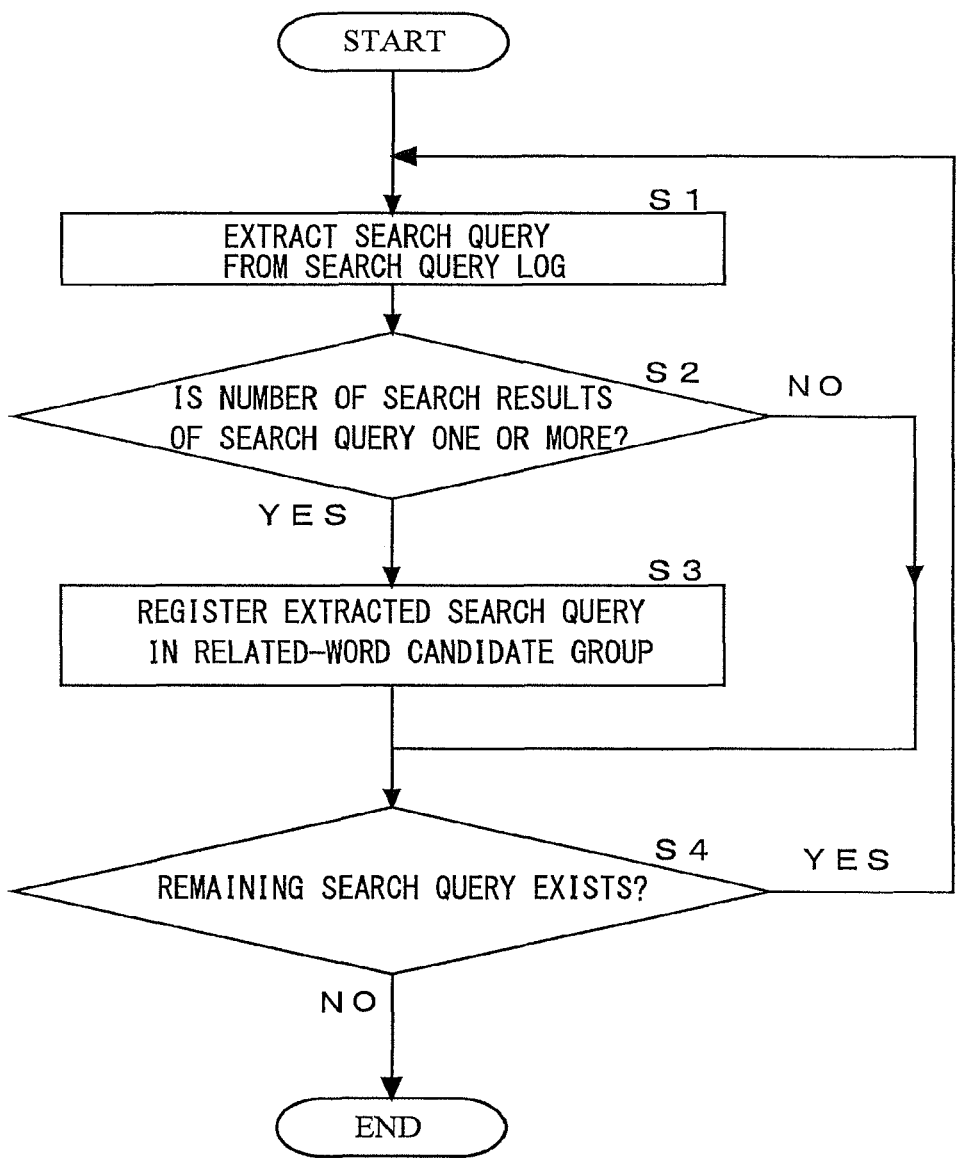
FIG. 5 is a flowchart illustrating an example of operations of generating a related-word candidate group of a related-word registration server in the operation of a first embodiment of a related-word registration system 1 in FIG. 1.
Figure 6:
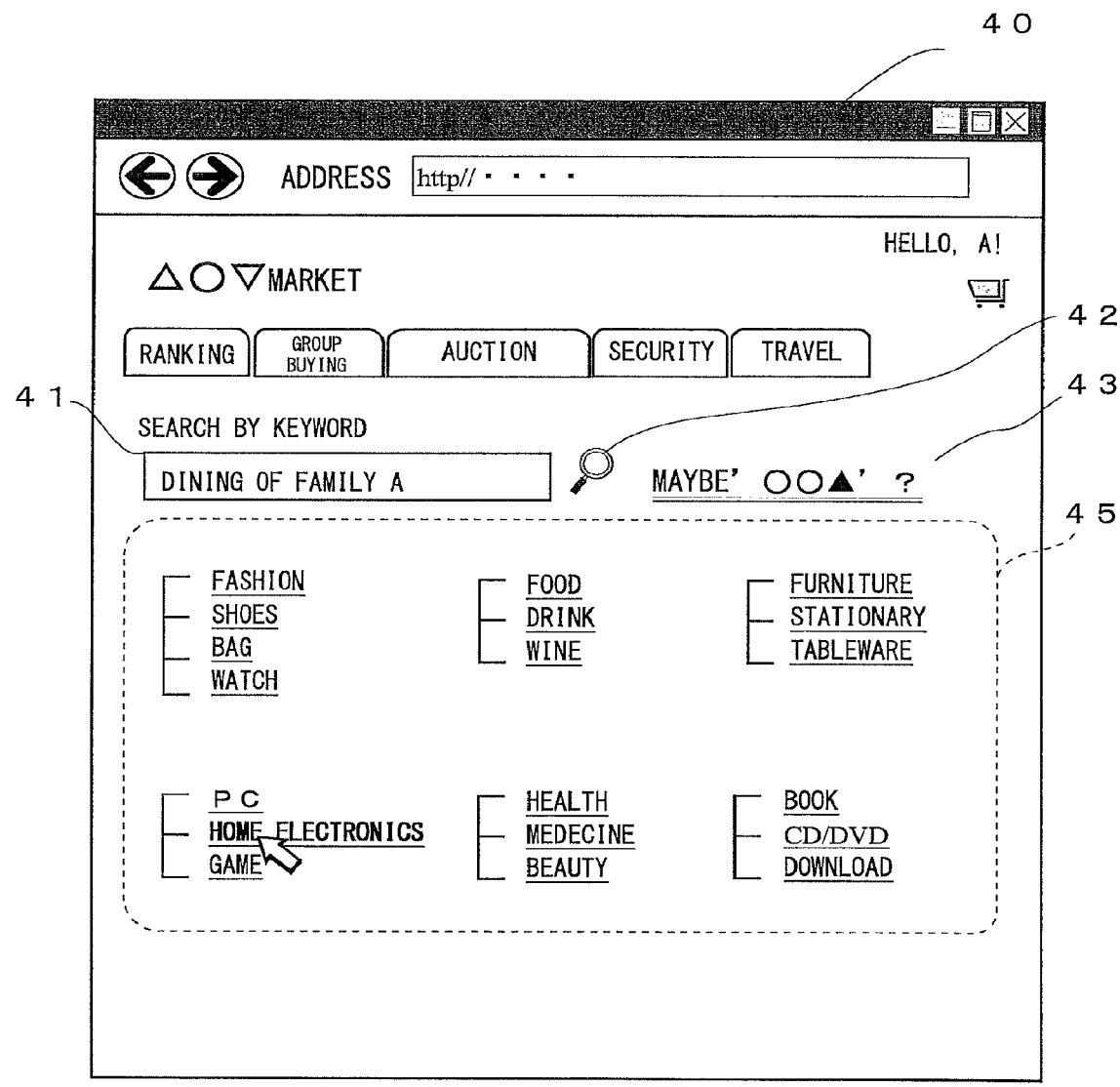
FIG. 6 is a schematic diagram illustrating an example of a web page displayed in the terminal in FIG. 1.
Figure 7:
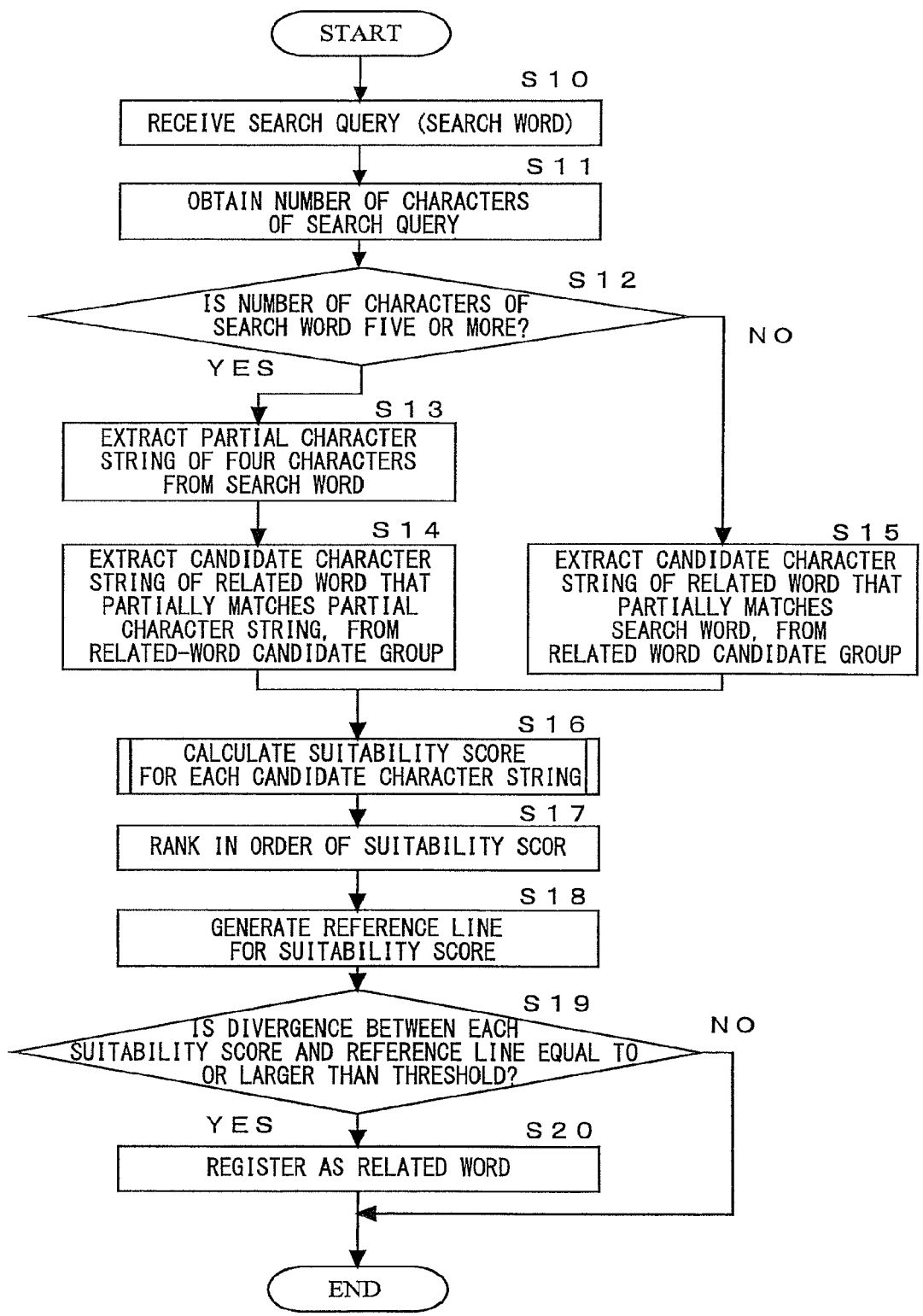
FIG. 7 is a flowchart illustrating an example of operations of registering a related word in the first embodiment in the related-word registration server in FIG. 1.
Figure 8:
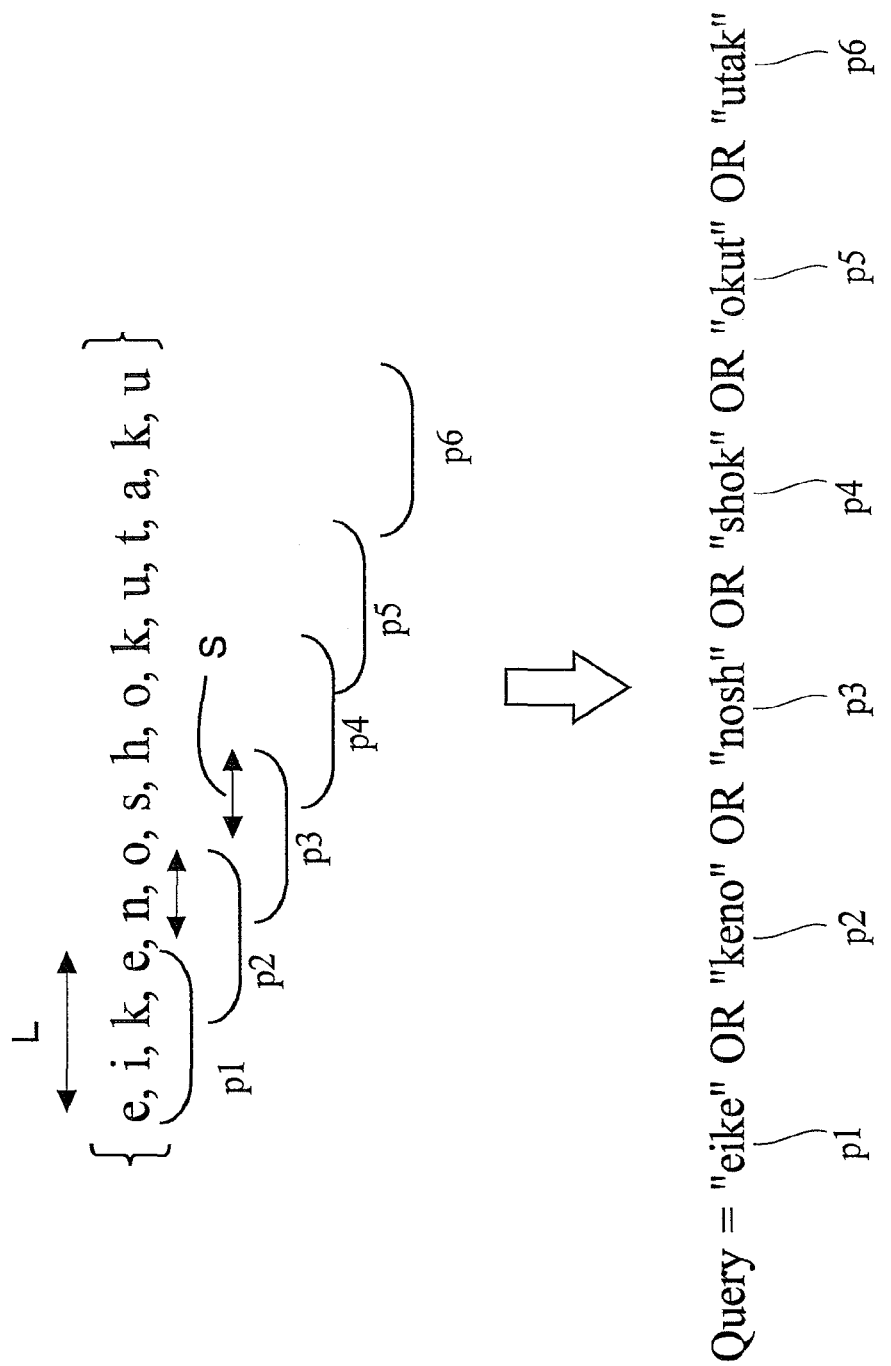
FIG. 8 is a schematic diagram illustrating an example of extraction of partial character strings.
Figure 9:
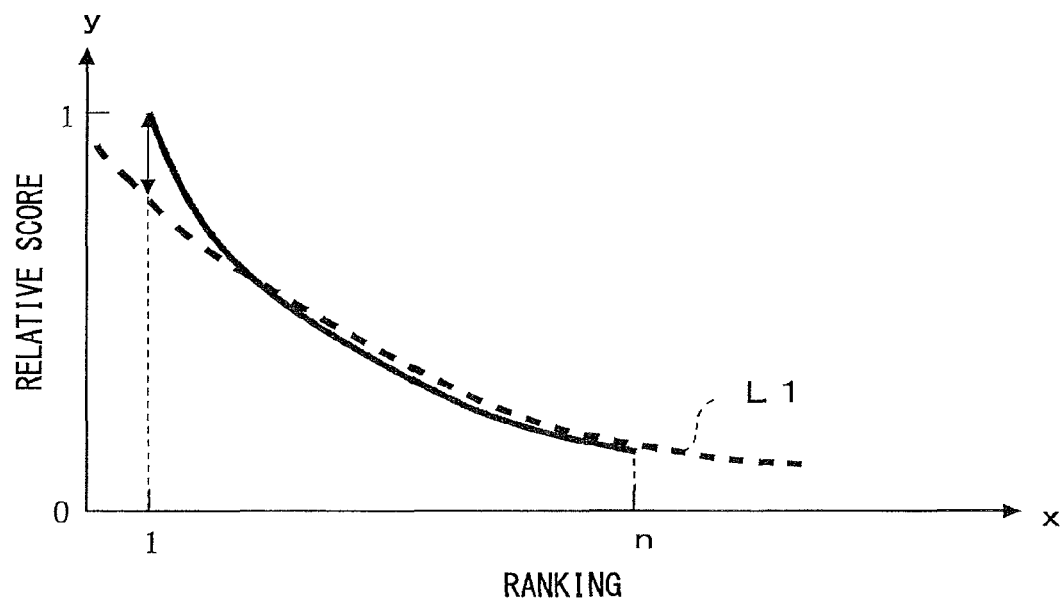
FIGS. 9A and 9B are schematic diagrams illustrating an example of a ranking score graph.
Figure 9:
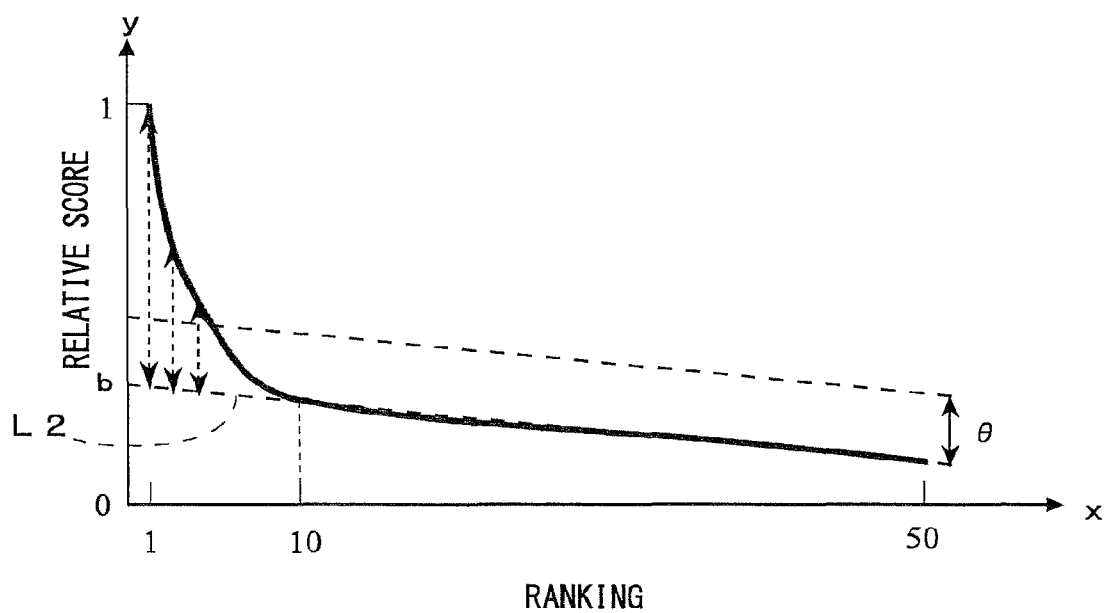
Figure 10:
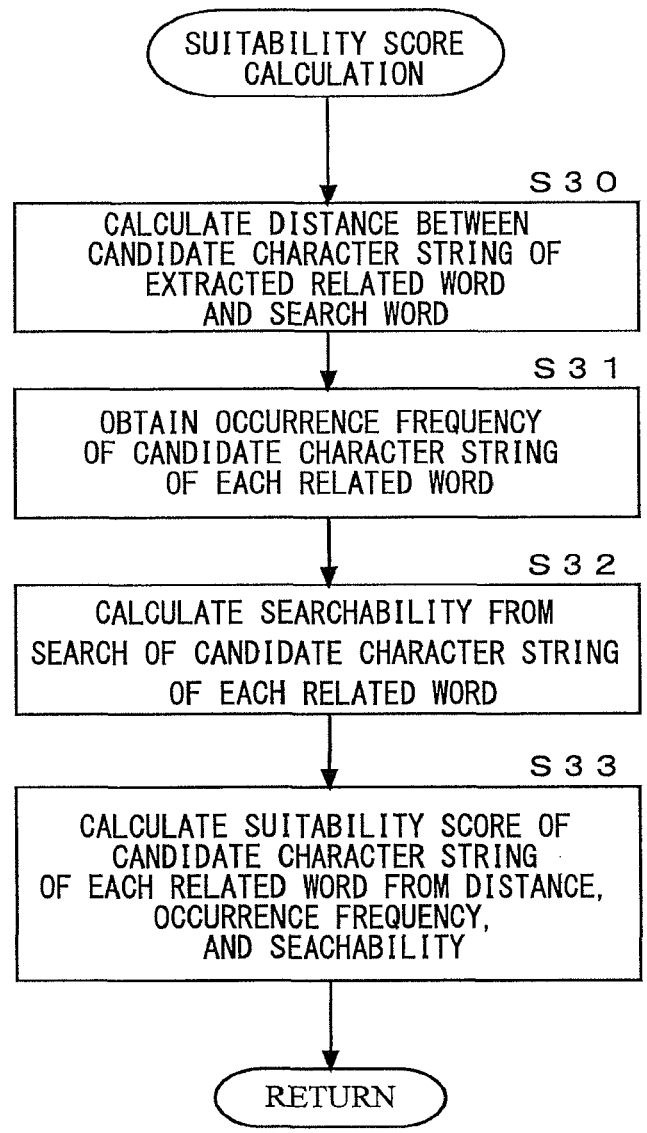
FIG. 10 is a flowchart illustrating a subroutine of the operation example of calculating a suitability score in the related-word registration server in FIG. 1.

FIG. 5 is a flowchart illustrating an example of operations of generating a related-word candidate group in the related-word registration server 10. FIG. 6 is a schematic diagram illustrating an example of a web page displayed in the terminal 30. FIG. 7 is a flowchart illustrating an example of operations of registering a related word in the related-word registration server. FIG. 8 is a schematic diagram illustrating an example of extraction of a partial character string. FIGS. 9A and 9B are schematic diagrams illustrating an example of a ranking score graph. FIG. 10 is a flowchart illustrating a subroutine of the operation example of calculating a suitability score in the related-word registration server 10. FIGS. 11A to 11C are diagrams illustrating an example of a pattern of availability for calculating the suitability score.

(3.1 Generation of Related-Word Candidate Group)

Generation of a related-word candidate group will be described using FIG. 5.

First, when a search query including a search word entered by the user is received from the terminal 30, the information providing server 20 performs a search and transmits the search query to the related-word registration server 10. Further, the information providing server 20 transmits the number of search results for the search query to the related-word registration server 10.

The related-word registration server 10 receives the search query and the number of search results from the information providing server 20 and stores the search query in association with the number of search results in the search query log DB 12*a*. The related-word registration server 10 may store the search query in association with received time when the search query is received and the user identification information for identifying the user such as the user ID or IP address.

Next, as illustrated in FIG. 5, the related-word registration server 10 extracts a search query from the search query log (step S1). Specifically, the system control unit 14 in the related-word registration server 10 extracts one search query from the search query log DB 12*a*.

Next, the related-word registration server 10 determines whether the search query is a search query whose number of search results is one or more (step S2). Specifically, the system control unit 14 of the related-word registration server 10 reads the number of search results corresponding to the extracted search query from the search query log DB 12*a* and determines whether the number of search results is one or more. In addition, the system control unit 14 in the related-word registration server 10 may transmit the extracted search query to the information providing server 20 to obtain the number of search results hit by the search query and receive the number of hits from the information providing server 20.

In the case where the number of search results is one or more (YES in step S2), the related-word registration server 10 registers the extracted search query in a related-word candidate group (step S3). Specifically, in the case of a query whose number of search results is one or more, that is, whose number of search requests is not zero, the system control unit 14 in the related-word registration server 10 registers the search query (including the search word as the related-word candidate character string) as a related-word candidate group into the related-word candidate DB 12*b*.

In the case where the number of search results is not one or larger (NO in step S2), the related-word registration server 10 does not register the extracted search query into the related-word candidate group.

Next, whether there is a remaining search query or not is determined (step S4). Specifically, the system control unit 14 in the related-word registration server 10 determines whether a search query which has not been subjected to the determination of the number of search results exists in the search query log DB 12a or not.

In the case where a remaining search query exists (YES in step S4), the related-word registration server 10 returns to step S1, and extracts a next search query. In the case where a remaining search query does not exist (NO in step S4), the process of generating the related-word candidate group is finished. In such a manner, the related-word registration server 10 preliminarily generates a related-word candidate group of a certain scale. The related-word registration server 10 functions as an example of a related-word candidate group generating means that generates a related-word candidate group by extracting candidates of a related word on the basis of a predetermined condition from a search query log in which logs regarding a search query are stored.

In addition, when the number of search results is not zero in the case where a search query is received and a search is performed, the information providing server 20 may add information that the number of search results is not zero to the search query and transmit the resultant to the related-word registration server 10. In this case, when the search query whose number of search results is not zero is received, the related-word registration server 10 stores it in the related-word candidate DB 12b.

(3.2 Registration of Related Word)

The operation of registering a related word will be described using FIGS. 6 to 9.

First, as illustrated in FIG. 6, in the display unit 33 of the terminal 30, a search word, for example, "dining of family A" is entered by the user into a search word input box 41 in a web page 40 provided from the information providing server 20. A search button 42 is clicked to conduct a search, and the terminal 30 transmits a search query including the search word to the information providing server 20. Next, the information providing server 20 receives the search query including the search word entered by the user from the terminal 30, and transmits it to the related-word registration server 10.

Next, as illustrated in FIG. 7, the related-word registration server 10 receives the search query including the search word entered by the user (step S10). Specifically, the system control unit 14 in the related-word registration server 10 receives the search query via the communication unit 11 from the information providing server 20. In addition, as described in the generation of a related-word candidate group, the related-word registration server 10 stores the received search query into the search query log DB 12a. In the case where the condition in step S2 is satisfied, the related-word registration server 10 may register the search query in a related-word candidate group.

Next, the related-word registration server 10 obtains the number of characters of the search word (step S11). Specifically, in the case where the search word included in the search query is a Chinese character or the like, the system control unit 14 of the related-word registration server 10 converts it to "hiragana" characters or roman characters. For example, the system control unit 14 in the related-word registration server 10 converts the Chinese characters (A家の食卓) into phonograms (えいけのしょくたく), thereby increasing the number of characters five characters to nine characters. Further, the system control unit 14 in the related-word registration server 10 converts the phonograms into roman characters (eikenoshokutaku), thereby further increasing the number of characters to 15. The system control unit 14 in the related-word registration server 10 obtains the number of characters (for example, nine or 15 characters) of the search word subjected to the phonogramic conversion such as Hiragana conversion and Roman character conversion.

Next, the related-word registration server 10 determines whether the number of characters of the search word is five or more (step S12). Specifically, the system control unit 14 in the related-word registration server 10 determines whether the number of characters of the search word subjected to the phonogramic conversion is five or more.

In the case where the number of characters of the search word is five or more (YES in step S12), the related-word registration server 10 extracts a partial character string of four characters from the search word (step S13). Specifically, as illustrated in FIG. 8, the system control unit 14 in the related-word registration server 10 generates and extracts, from the character string "eikenoshokutaku" of the search word, partial character strings such as a partial character string p1 ("eike") and a partial character string p2 ("keno") by setting the length (window size) L of a partial character string to four and setting the slide width (sliding size) S of a window to two. In addition, on the basis of the length L of a partial character string, the threshold (five characters) in step S2 is set to a value larger than the length "L" of the partial character string.

As described above, the related-word registration server 10 functions as an example of a partial character string generating means that generates a partial character string from the character string of a search word. The related-word registration server 10 functions as an example of a partial character string generating means that sets length of a partial character string on the basis of the number of characters of the search word and generates a partial character string having the set length. The related-word registration server 10 functions as an example of a partial character string generating means that sets shift width of the number of characters of the search word at the time of generating a partial character string on the basis of the number of characters of the search word and generates a partial character string in the set shift width. The related-word registration server 10 functions as an example of a partial character string generating means that generates a partial character string from a search word obtained by phonogram-converting a search word.

Next, the related-word registration server 10 extracts a candidate character string of a related word partially matching a partial character string from a related-word candidate group (step S14). Specifically, the system control unit 14 in the related-word registration server 10 generates a search query="eike" OR "keno" OR "nosh" OR "shok" OR "okut" OR "utak" from the partial character string illustrated in FIG. 8, and extracts candidate character strings of the related word from the related-word candidate DB 12b on the basis of this search query. That is, the system control unit 14 in the related-word registration server 10 extracts a candidate character string partially matching each of the extracted partial character strings. Here, the partial match denotes, for example, in the case of the partial character string "eike", a candidate character string including "eike" or candidate character strings including "eik" as a part of "eike". In such a manner, the related-word registration server 10 functions as an example of a candidate character string extracting means that extracts a candidate character string from a related word candidate group on the basis of the generated partial character string.

In the case where the number of characters of the search word is not equal to or larger than five (NO in step S12), the related-word registration server 10 extracts a candidate character string of a related word partially matching the search word from the related-word candidate group (step S15). Specifically, the system control unit 14 of the related-word registration server 10 does not extract a partial character string but extracts the received search word itself or a candidate character string partially matching the phonogram-converted search word from the related-word candidate DB 12b.

In addition, the system control unit 14 of the related-word registration server 10 may extract a candidate character string similar to a partial character string or a search word on the basis of similarity. In addition, as the similarity, distance between character strings such as Jaro-Winkler distance or Levenshtein distance may be used.

Next, the related-word registration server 10 calculates a suitability score of candidate character strings of each related word (step S16). Specifically, the system control unit 14 of the related-word registration server 10 calculates a suitability score of each of the extracted candidate character strings by a suitability score subroutine to be described later.

Next, the related-word registration server 10 obtains ranking in order of the suitability scores (step S17). Specifically, the system control unit 14 of the related-word registration server 10 performs a process of arranging the candidate character strings in descending order of the suitability scores. The system control unit 14 of the related-word registration server 10 extracts candidate character strings of predetermined number of higher scores, for example, top fifty candidate character strings and narrows down the candidate character strings. In such a manner, the related-word registration server 10 functions as an example of a ranking means that ranks the candidate character strings in order of scores.

Next, the related-word registration server 10 generates a reference line for the suitability scores (step S18). Specifically, the system control unit 14 of the related-word registration server 10 determines and generates a reference line from the words whose suitability scores are in the top ranks in the extracted top candidate character strings of the related word. More specifically, as illustrated in FIG. 9A, in a graph illustrating suitability scores relative to the ranking, the system control unit 14 sets, as a reference line L1, an approximate function approximating points of, for example, the first to n-th suitability scores.

Here, the approximate function as an example of the reference line includes a logarithm function, an exponential function, a power function such as a linear function, a quadratic function, or a cubic function, a function of a conic section such as a hyperbolic curve, and the like. Any approximate function may be employed as long as it approximates or interpolates points of a ranking-score graph. At the time of obtaining an approximate function, it is sufficient to use a criterion of the least-squares method or the like. The relative suitability score is, for example, the value of the top suitability score in the ranking and is a value obtained by dividing the scores. In addition, at the time of determining the reference line L1, lower suitability scores, for example, fiftieth to tenth scores may be determined by the least-squares method. In addition, since the suitability scores are arranged in ranking order, the ranking-score curve becomes a weakly decreasing graph.

As described above, the related-word registration server 10 functions as an example of a criterion generating means that generates a reference line of suitability scores in the ranking as a criterion to determine whether a candidate character string is registered as a related word or not on the basis of the suitability score and ranking of the candidate character strings. The related-word registration server 10 also functions as an example of a criterion generating means that obtains a reference line by an approximate function which approximates relation between the ranking and the suitability score. The related-word registration server 10 also functions as an example of the criterion generating means that obtains a reference line from data of ranking in a predetermined range.

Next, the related-word registration server 10 determines whether a divergence between each of the suitability scores and the reference line is equal to or larger than a threshold (step S19). Specifically, the system control unit 14 of the related-word registration server 10 determines whether the difference between the reference line L1 and the top score in the ranking is equal to or larger than the threshold. Specifically, the system control unit 14 of the related-word registration server 10 calculates the difference by subtracting a value obtained by substituting the value of the ranking into the equation of the reference line L1 from the suitability score of the top score in the ranking. When the difference is equal to or larger than the threshold θ, the candidate character string is extracted as a registration character string of the related word. Here, the threshold is preliminarily obtained, for example, like 0.1 time of the reference line by performing simulation while changing a parameter or the like to adjust the suitability score. In this case, the system control unit 14 of the related-word registration server 10 extracts a candidate character string whose suitability score is 1.1 times of the reference line as a related word.

As described above, the related-word registration server 10 functions as an example of a registration character string extracting means that extracts a registration character string for registering, as a related word, a candidate character string whose suitability score is apart from the reference line L1 by the preset threshold θ or larger.

In the case where the divergence between each of the suitability scores and the reference line is equal to or larger than the threshold (YES in step S19), the related-word registration server 10 registers the related-word candidate character string whose divergence from the reference line is equal to or larger than the threshold as a related word. Specifically, in the case where the divergence between each of the suitability scores and the reference line is equal to or larger than the threshold, the system control unit 14 of the related-word registration server 10 registers the candidate character string having the top score in the ranking into the related-word DB 12c as a registration character string of the related word of the received search word. In addition, in the case where there are a plurality of (for example, three) candidate character strings whose suitability score is apart from the reference line by the threshold or larger, the system control unit 14 of the related-word registration server 10 may store, not necessarily the candidate character string as the top in the ranking, the top-three candidate character strings in the ranking, predetermined number of candidate character strings like the top and the third-order candidate characteristic strings, or a candidate character string in predetermined order such as the second-order candidate characteristic string in the ranking. In such a manner, the related-word registration server 10 functions as an example of the related-word registering means that registers the extracted registration character string and the search word as related words in the related-word database.

In the case where the difference is not equal to or larger than the threshold (NO in step S19), the related-word registration server 10 finishes the process.

User of the constructed related-word database will now be described.

At the time of performing a search on the basis of a search query received from the terminal 30 of the user, the information providing server 20 as the related-word extracting means extracts a related word corresponding to a search word in the search query with reference to the related-word DB 12c in the related-word registration server 10. For example, the information providing server 20 transmits the received search query to the related-word registration server 10. The related-word registration server 10 receives the search query from the information providing server 20 and extracts a registration character string corresponding to the search word in the search query from the related-word DB 12c. The related-word registration server 10 as an example of the related-word output means transmits, as a related word, the extracted registration character string to the information providing server 20. The information providing server 20 transmits the received related word to the terminal 30. As illustrated in FIG. 6, the terminal 30 displays the received related word like "maybe "XXX"?" in a related-word display box 43. In addition, a plurality of related words may be displayed like "related word in ranking 1" and "related word in ranking 2". Not only in the case where the number of search results is zero or small, a related word may be displayed.

(3.3 Subroutine of Calculation of Suitability Score)

Figure 11:
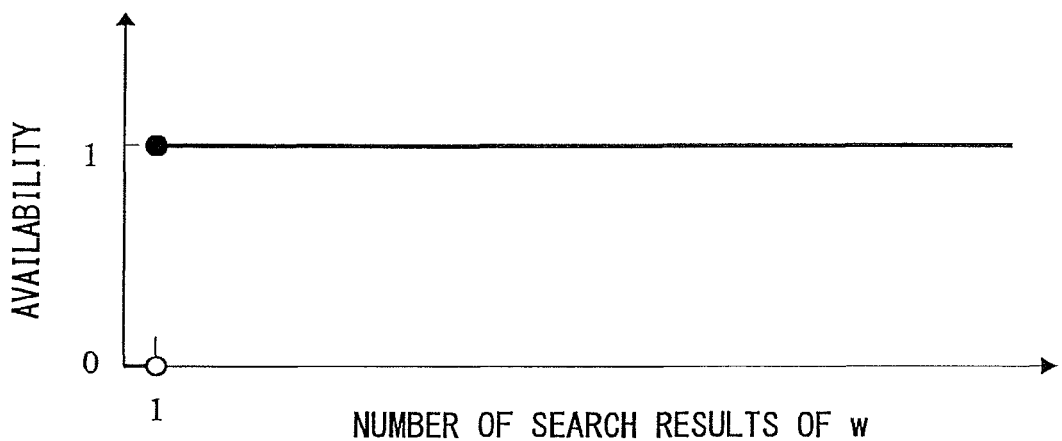
FIGS. 11A to 11C are diagrams illustrating an example of a pattern of availability for calculating the suitability score.
Figure 11:
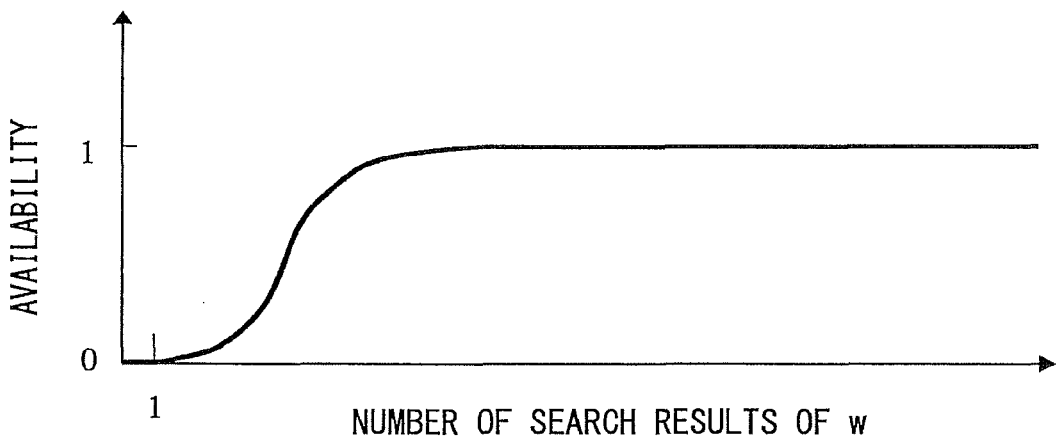
Figure 11:
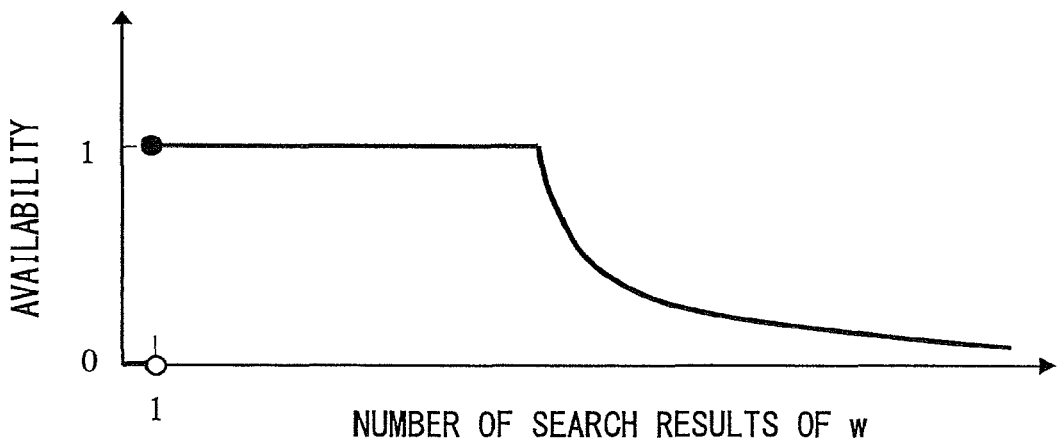

A subroutine of calculation of a suitability score will now be described using FIGS. 10 and 11.

After the candidate characteristic string of the related word is extracted in step S14 or S15, as illustrated in FIG. 10, the related-word registration server 10 calculates the distance between the candidate character string of the extracted related word and the search word (step S30). Specifically, the system control unit 14 of the related-word registration server 10 calculates, for example, a distance (w, u) between a search word "u" and a candidate character string "w" by the equation (1).

[Equation 1]

$$\text{Distance}(w,u) = \alpha \cdot \text{Dist}(w,u) + \beta \cdot \text{Dist.Yomi}(w,u) \quad (1)$$

where "distance (w,u)" denotes the distance between the search word "u" and the candidate character string "w" and is an index (an example of similarity indicating how similar the search word "u" and the candidate character string "w" are. Dist(w,u) denotes Jaro-Winkler distance between the candidate character string "w" and the search word "u", Dist.Yomi (w,u) denotes Jaro-Winkler distance between reading of the candidate character string "w" and the search word "u". Coefficients $\alpha$ and $\beta$ have the relation of $\alpha+\beta=1$. When it is desired to attach importance to reading, the ratio of the coefficient $\beta$ is increased (for example, $\alpha<\beta$, $\alpha=0.3$, $\beta=0.7$). Although "distance(w,u)" is preferably the Jaro-Winkler distance which can be expressed in 0 to 1 as a distance, it is not limited to the Jaro-Winkler distance but may be Levenshtein distance or an index expressing similarity between the search word "u" and the candidate character string "w".

Next, the related-word registration server 10 obtains occurrence frequency of a candidate character string of each related word (step S31). Specifically, the system control unit 14 of the related-word registration server 10 calculates occurrence frequency of a candidate character string of each related word in a search query log. More specifically, the system control unit 14 of the related-word registration server 10 calculates P(w) for each candidate character string "w" on the basis of data of the search query log DB 12a by the equation (2).

[Equation 2]

$$P(w) = \log_{10}(\text{Occ.Count}(w)) \quad (2)$$

where P (w) relates to occurrence frequency indicating how frequently the candidate character string "w" is searched in the search log data in the search query log DB 12a. In addition, Occ.Count(w) denotes the number of appearance times of the candidate character string "w" (the number of use times of the candidate character string) in the search query log. In the case of using the search query log data in the search query log DB 12a, a word having high P(w) is a common word which is entered often in searches by various users. In such a manner, the system control unit 14 of the related-word registration server 10 as an example of a suitability score calculating means, calculates a suitability score on the basis of the data in search query storing means (search query log DB 12a).

Next, the related-word registration server 10 calculates searchability (availability) from the number of searches in a product DB 22a of a candidate character string of each related word (step S32). Specifically, the system control unit 14 of the related-word registration server 10 transmits a candidate character string "w" of each related word to the information providing server 20, and the system control unit 24 of the information providing server 20 obtains the number of searches (the number of search results) in the product DB 22a and transmits the number of searches of each of candidate character strings "w" to the related-word registration server 10.

The system control unit 14 of the related-word registration server 10 calculates the value of the searchability of the candidate character string "w" from the number of searches by the equation (3).

[Equation 3]

$$\text{Availability}(w) = \begin{cases} 1 & (\# \text{ of Search Result}(w) > 0) \\ 0 & (\# \text{ of Search Result}(w) = 0) \end{cases} \quad (3)$$

"Availability (w)" denotes a weight coefficient for the number of search results (the number of search hits) of searches with the candidate character string "w" and is expressed by the following equation. "# of Search Result (w)" denotes the number of search results of the candidate character strings "w". Availability includes not only the equation (3) as illustrated in FIG. 11A but also variations as illustrated in FIGS. 11B and 11C.

Next, the related-word registration server 10 calculates a suitability score of the candidate character string of each related word from the distance between the search word and the candidate character string of the related word, the occurrence frequency of the candidate character string of each related word, and the searchability of the candidate character string of each related word (step S33). Specifically, the system control unit 14 of the related-word registration server 10 calculates the suitability score of each candidate character string "w" by the equation (4).

[Equation 4]

$$\text{Score}(w \mid u) = \frac{P(w) + \gamma}{\text{Distance}(w, u) + \delta} \cdot \text{Availability}(w) \quad (4)$$

where $\gamma$ and $\delta$ are parameters for adjusting the suitability score. The parameter $\gamma$ is an adjustment value for P(w) and expresses the degree of allowing correction to a word which is not entered so much. The value P(w) of a word which is not entered so much is small, so that it is difficult to pick up a new word and a new product by a search. In the case where it is desired to pick up a word which is not used so much by a search, the value of the parameter γ is increased by setting on the server side.

The parameter δ is an adjustment value for Distance(w,u) and mainly prevents Distance(w,u) from becoming zero and prevents the score value from diverging. In addition, the related-word registration server 10 presets the parameters γ and δ in the equation (4) and the parameter α and β in the equation (1) (for example, γ>δ, γ>1, δ<1, γ=2, δ=0.01).

As described above, the related-word registration server 10 functions as an example of a score calculating means that calculates the suitability score of a candidate character string on the basis of similarity between the candidate character string and the search word, the number of use times of the candidate character string, and the number of search results of a search by the candidate character string. The related-word registration server 10 functions as parameter adjusting means that adjusts information of similarity and the number of use times.

In the foregoing embodiment, a related-word candidate group obtained by extracting candidate character strings of a related word whose number of search results is one or more (an example of a predetermined condition) from the search query log DB 12a in which logs regarding a search query are stored is generated and stored into the related-word candidate DB 12b. A search query of a search word entered by the user is received, and a partial character string is generated from a character string of the search word. On the basis of the partial character strings, a candidate character string is extracted from the related-word candidate group in the related-word candidate DB 12b. A suitability score of the candidate character string is calculated on the basis of similarity between the candidate character string and the search word, the number of use times of the candidate character string, and the number of search results of the search of the candidate character string. The candidate character strings are ranked in order of the scores. A reference line of a suitability score for the ranking is generated as a criterion of determining whether the candidate character string is registered as a related word or not on the basis of the suitability score and the ranking of the candidate character string. As a registration character string to be registered as a related word, a candidate character string whose suitability score is apart from the reference line by a preset threshold or larger is extracted. The extracted registration character string is registered as a related word of the search word into the related-word DB 12c. Consequently, since a candidate character string is extracted from the related-word candidate group on the basis of a partial character string having a smaller number of characters, registration of an unnecessary related word can be suppressed by the suitability score of the candidate character string, and the precision of a related word can be improved. Further, according to the embodiment, the speed of the process can be increased.

When a search word is presented to the user on the basis of a related word, the user can reach a target search object quickly.

In the case where the related-word registration server 10 sets length of a partial character string on the basis of the number of characters of a search word and generates a partial character string having the set length, by determining the length of the partial character string, the efficiency of the process can be improved, and the processing speed and precision of a related word can be improved.

In the case where the related-word registration server 10 sets shift width of the number of characters of a search word at the time of generating a partial character string on the basis of the number of characters of a search word and generates a partial character string with the set shift width, the speed of the process can be increased.

In the case where the related-word registration server 10 generates a partial character string for a search word obtained by phonogram converting a search word, even in the case of a short word, a partial character string can be extracted efficiently, and the processing speed and the precision of a related word can be improved.

In the case where the related-word registration server 10 further includes, as parameter adjusting means, parameters δ and γ which adjust information of the similarity and the number of use times of the score calculating means, by adjusting the parameters δ and γ, the suitability score can be changed according to the characteristics and situations of the user, and the precision of a related word can be improved.

The related-word registration server 10 as determination reference generating means obtains the reference line by an approximate function which approximates relation between the ranking and the suitability score, so that a registration character string of a related word is detected more easily as an abnormal value out of the approximate function, and the precision of the related word can be further improved.

In the case where the related-word registration server 10 as determination reference generating means obtains the reference line L1 by data of ranking in a predetermined range (for example, top ranks), a candidate character string deviated from the reference line L1 can be detected, so that a candidate character string in a higher rank can be properly extracted.

In the case where the product DB 22a is further provided as an example of a search word storing means that stores a search word related to a product being sold in an internal or external EC site, particularly, availability can be easily calculated by using data of the product DB 22a and can be reflected in a suitability score.

In the case where the related-word registration server 10 further includes the search query log DB 12a as an example of a search query storing means that stores a log on a search query and calculates the suitability score on the basis of data of the search query log DB 12a, when candidate character strings are extracted from words stored in the search query log DB 12a, candidate character strings can be one-dimensionally narrowed down to candidate character strings on which the interests of the user are concentrated. In particular, in the case of using a recent log, a candidate character string in which preferences of the user are particularly reflected can be extracted.

The related-word registration server 10 may set the upper limit to the number of registration character strings extracted by the registration character string extracting means in step S19. In this case, registration of unnecessary related words can be suppressed, and precision of related words can be improved.

In the case where the information providing server 20 extracts and outputs a related word corresponding to a search word of a received search query with reference to the related-word database, a high-precision related word by which the user can reach a target search object quickly can be presented to the user.

In addition, the reference line may be determined also from a candidate character string whose suitability score is in a rank lower than a candidate character string of a high-order related word extracted. More specifically, as illustrated in FIG. 9B, in a graph illustrating suitability scores relative to ranking, the system control unit 14 of the related-word registration server 10 determines, for example, a straight line (reference line L2) connecting suitability scores at the 50th order and 10th order.

The reference line L2 is expressed by an equation of a straight line of y=ax+b in the graph in which the x axis indicates ranking and the y axis indicates the relative suitability score. Here, a relative suitability score is, for example, a value of a suitability score at the first order in the ranking and is a value obtained by dividing each score. In addition, at the time of determining the reference line L2, low-order suitability scores, that is, scores from the 50th order to the 10th order may be determined by the least square method. Here, as illustrated in FIG. 9B, lower suitability scores approximate mutually in the ranking order as compared with higher suitability scores.

Here, the reference line L2 is an example of the approximate function which approximates relation between the ranking and the suitability score and a straight line connecting the suitability scores at the 50th order and the 10th order. In addition, the approximate function is not limited to a straight line (linear function) but may be a logarithm function, an exponential function, a power function such as a quadratic function or a cubic function, a function of a conic section such as a hyperbolic curve, and the like.

After the reference line L2 is determined, the related-word registration server 10 obtains the value of an intercept "b" to the "y" axis of the reference line (the axis of the relative suitability score) and sets a value obtained by multiplying the value of the intercept "b" with a constant as a threshold θ.

In addition, in step S13, the related-word registration server 10 may extract a partial character string and, according to the number of characters of a search word, dynamically change the length L of the partial character string and the slide width S of window. For example, in the case where the number of characters of a search word is large, the length L of the partial character string is increased, and the slide width S is widened. In the case where L is set to 4 and S is set to 3 as reference values for the number of characters of 15, when the number of characters of a search word is 40, the length of the character string is increased like L=8 and S=3, the slide width is increased like L=4 and S=5, and the length of the character string and the slide width are increased like L=8 and S=5. In the case where the related-word registration server 10 dynamically changes the length L of a partial character string and the slide width S of window in accordance with the number of characters of a search word, the processing speed and the precision of a related word can be improved.

A shopping site may be an external EC site connected to the network 3, and the information providing server 20 is not limited to product search but may be a general search server. In this case, searchability (availability) is calculated from the number of search times of a search server in an eternal EC site or the like.

[4. Operation of Second Embodiment in Related-Word Registration System]

The operation of a second embodiment in the related-word registration system 1 according to an embodiment of the present invention will be described using FIG. 6 and FIGS. 12 to 16. The same reference numerals are used for operations which are the same or similar to those of the first embodiment, and different points will be mainly described. The other embodiments and modifications will be also described in a similar manner.

(4.1 Generation of Search Query Log and Character String Set Group)

First, generation of a search query log and a character string set group will be described using FIG. 6 and FIGS. 12 to 14.

In addition, description will start from a state where the search query log DB 12a is built to some degree. In the search query log DB 12a, a search query associated with received time of a search query is stored together with user identification information. Further, the search query is stored so as to be associated also with category information of a product (category information will be described later).

For example, in the case of a search query from the terminal 30 of the user A who logs in a shopping site, examples of the user identification information include the user ID of the user A and the IP address existing in the header of the search query transmitted from the terminal 30 of the user A.

Examples of the received time include received time when the information providing server 20 receives the search query from the terminal 30 and received time when the related-word registration server 10 receives the search query from the information providing server 20. In the case of received time when the information providing server 20 receives the search query from the terminal, the information providing server 20 transmits also the received time of the search query to the related-word registration server 10. The received time may be a time stamp attached when the search query is stored in the search query log DB 12a.

First, the user (for example, the user A) logs in a shopping site by the terminal 30 of the user A, as illustrated in FIG. 6, information of the web page 40 as the top page of the shopping site is transmitted from the information providing server 20 to the terminal 30. The web page 40 is displayed in the display unit 33 of the terminal 30. In the web page 40 as the top page of the shopping site, top category display 45 is displayed and linked to the categories. Further, category display 46 of products and services of related group companies of the shopping site is displayed and linked to the categories. In the web page 40, information of the user A, "Hello, A!" is displayed.

Figure 12:
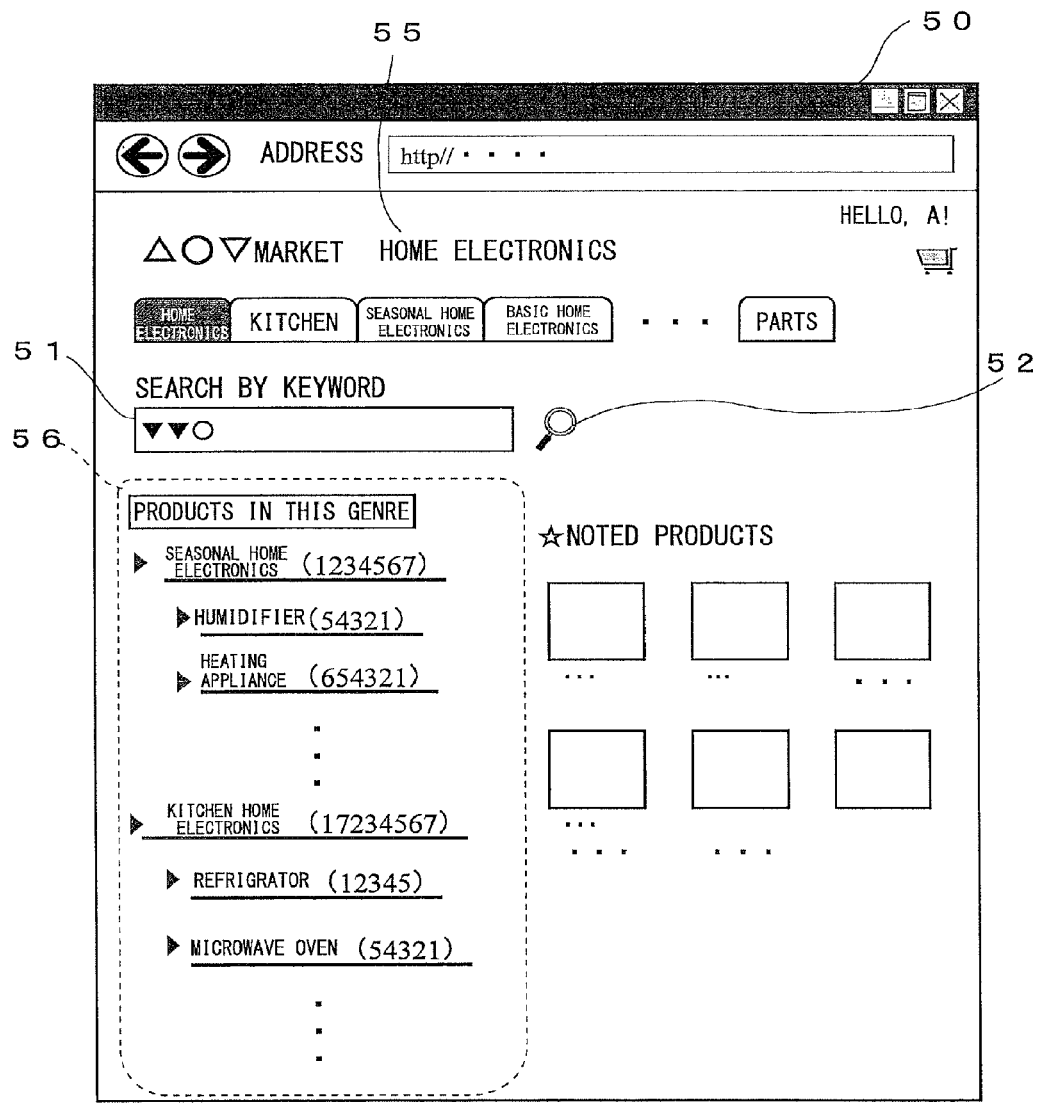
FIG. 12 is a schematic diagram illustrating an example of a web page displayed in a terminal in an operation of a second embodiment of the related-word registration system 1 in FIG. 1.

When the link of the product category of "home electronics" is clicked in the web page 40 as illustrated in FIG. 6, a web page 50 of "home electronics" is displayed in the display unit 33 as illustrated in FIG. 12. In the web page 50, a sub-category display 56 in a category display 55 of the top category "home electronics" is displayed.

When a search word "xxx" is entered in a search word entry box 51 in the web page 50 and a search button 52 is clicked, the system control unit 36 of the terminal 30 transmits the search query to the information providing server 20 via the communication unit 31. The search query has the entered search word, the category information (category identification number or the like indicative of a category display 65 of the top category "home electronics") of the web page 50, the user ID of (the user A) as an example of the user identification information, and the like.

Next, the information providing server 20 receives the search query from the terminal 30, transmits it to the related-word registration server 10, and searches the product DB 22a for a product. The information providing server 20 specifies the IP address of the sender of the search query and transmits the IP address as well to the related-word registration server 10. The IP address is an example of the user identification information and is used in place of the user ID when the user does not log in.

Figure 13:
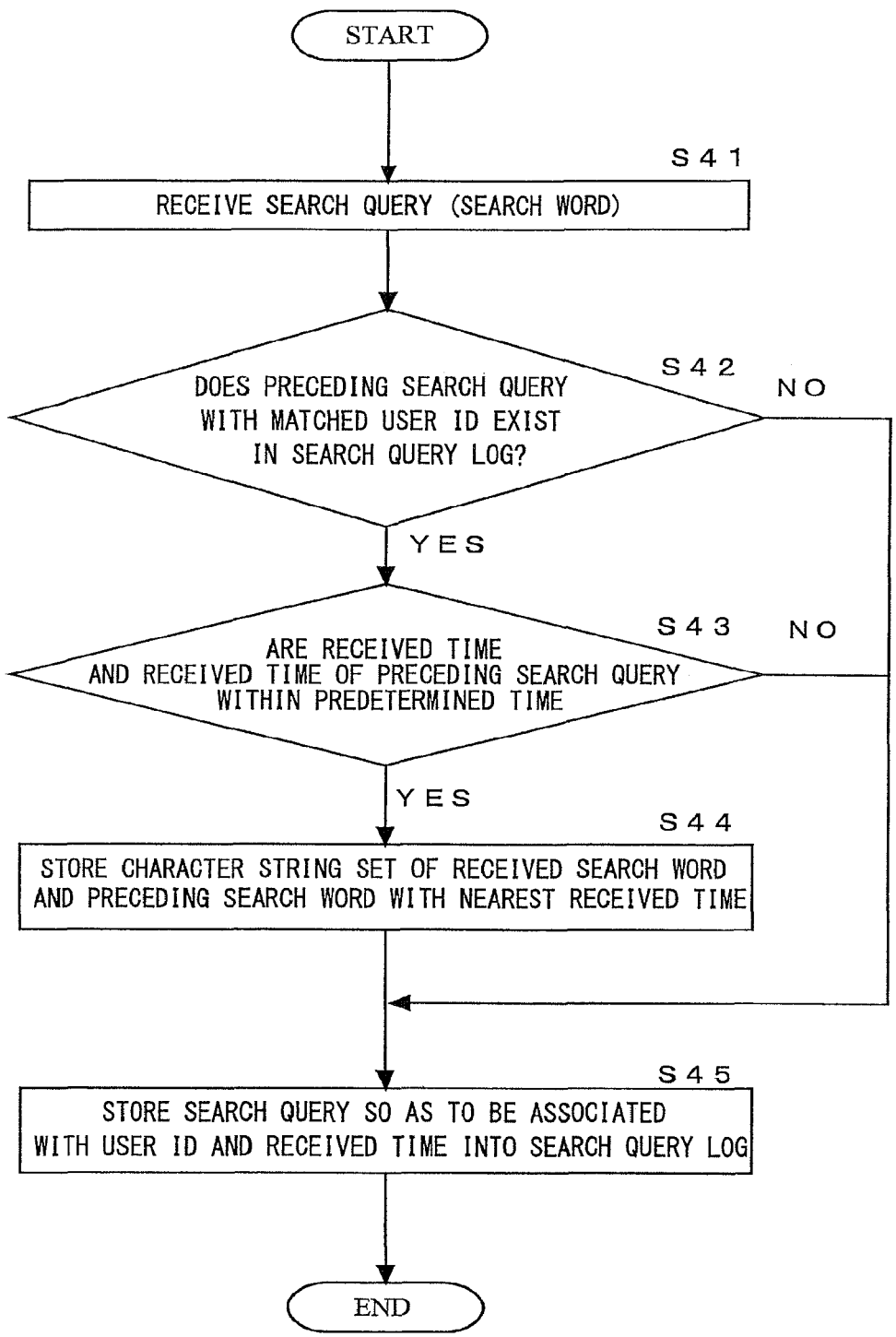
FIG. 13 is a flowchart illustrating an example of operations of building a search query log database of the related-word registration server in FIG. 1.

Next, as illustrated in FIG. 13, the related-word registration server 10 receives the search query including the search word (step S41). Specifically, the system control unit 14 of the related-word registration server 10 receives the search query from the information providing server 20 via the communication unit 11, and stores the received search query in association with received time of the search query into the search query log DB 12a. Further, the system control unit 14 of the related-word registration server 10 stores the search query in association with the IP address into the search query log DB 12a. In addition, the system control unit 14 of the related-word registration server 10 may put the IP address in the search query. Since it is sufficient to know the reception order of search queries, the system control unit 14 of the related-word registration server 10 may store search queries in association with reception orders, not the received time, into the search query log DB 12a. In such a manner, the system control unit 14 of the related-word registration server 10 functions as an example of a search query storing means that stores received search queries in reception order.

Next, the related-word registration server 10 determines whether a preceding search query with matched user ID exists in the search query log or not (step S42). Specifically, the system control unit 14 of the related-word registration server 10 extracts a search query whose user ID matches the user ID of the user A and whose received time is earlier than that of the received search query (an example of earlier reception order) from the search query log DB 12a. In the case where the preceding search query can be extracted, the system control unit 14 of the related-word registration server 10 determines that the preceding search query exists in the search query log. In the case where the preceding search query cannot be extracted, the system control unit 14 determines that a preceding search query does not exist. In addition, the system control unit 14 of the related-word registration server 10 may extract a preceding search query whose IP address matches the IP address of the received search query and whose received time is earlier than that of the received search query from the search query log DB 12a.

Here, the case where user IDs match or the case where IP addresses match is an example of a preset search query extraction condition. In such a manner, the related-word registration server 10 functions as an example of a search query extracting means that extracts a preceding search query whose user identification information matches that of the user who entered the search query as the search query extraction condition.

In the case where a preceding search query having the matched user ID exists in the search query log (YES in step S42), the related-word registration server 10 determines whether received time and received time of the preceding search query are within predetermined time or not (step S43). Specifically, the system control unit 14 of the related-word registration server 10 extracts a preceding search query whose received time has a difference from that of the received search query, which is within predetermined time (for example, three seconds to 60 seconds). In the case where the preceding search query can be extracted, the system control unit 14 of the related-word registration server 10 determines that the preceding search query was received within the predetermined time. In the case where the preceding search query cannot be extracted, the system control unit 14 determines that no preceding search query was received within the predetermined time.

Here, in this case, the predetermined time is an example of the preset search query extraction condition. In such a manner, the related-word registration server 10 functions as an example of a search query extracting means that extracts a preceding search query whose received time is earlier than that of a received search query on the basis of the preset search query extraction condition. The related-word registration server 10 also functions as search query extracting means that extracts a preceding search query whose received time is within predetermined time since received time of the search query as the search query extraction condition.

In the case where the received time and the received time of the preceding search query are within predetermined time (YES in step S43), the related-word registration server 10 stores a character string set of the received search word and the preceding search word whose received time is closest (step S44). Specifically, the system control unit 14 of the related-word registration server 10 selects a search word constructing the received search query and a search word constructing the preceding search query whose received time is closest from the extracted preceding queries and stores a character string set of the preceding search word and the received search word into the character string set DB 12d.

In addition, the system control unit 14 of the related-word registration server 10 may narrow down preceding search queries whose category information (for example, the top category) matches as an example of the preset search query extraction condition.

Next, the related-word registration server 10 stores the search query in association with the user ID and the received time into the search query log (step S45). Specifically, the system control unit 14 of the related-word registration server 10 stores the search query in association with the category information, the user ID (or IP address), and the received time into the search query log DB 12a. In the case where a preceding search query whose user ID matches does not exist in the search query log (NO in step S42) or in the case where received time of the search query and received time of the preceding search query are not within predetermined time (NO in step S43), the system control unit 14 of the related-word registration server 10 stores the search query in association with the user ID and the received time into the search query log DB 12a.

In such a manner, the related-word registration server 10 functions as an example of a character string set storing means that stores, as a character string set, a preceding search word constructing an extracted preceding search query and a search word constructing a received search query.

Figure 14:
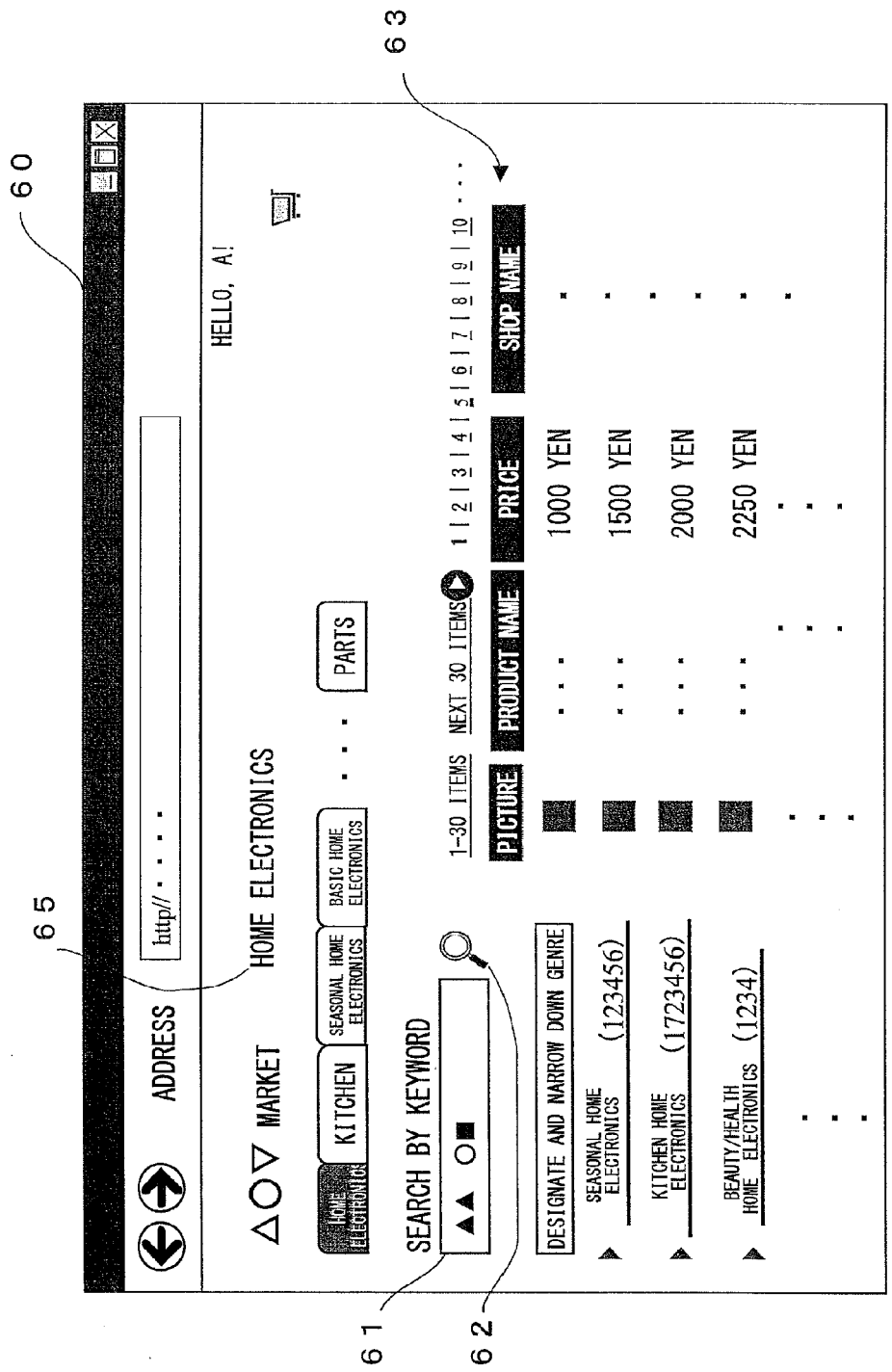
FIG. 14 is a schematic diagram illustrating an example of a web page displayed in the terminal in FIG. 1.

Next, the information providing server 20 performs a product search and, after that, transmits, as a search result, the information of a web page 60 to the terminal 30 as illustrated in FIG. 14.

Next, the terminal 30 receives the information of the web page 60 from the information providing server 20 and displays it in the display unit 33.

When the user A looks at the search result of the web page 60 and finds a target product, the user A clicks the product in a product display box 63. When there is no target product, the user A enters another search word in a search word entry box 61 and clicks a search button 62. As described above, the terminal 30 transmits a search query including the search word "xxx" and category information ("home electronics") to the information providing server 20. The information providing server 20 receives the search query, and transmits it to the related-word registration server 10 to perform a search. The related-word registration server 10 receives the search query (step S41) and performs processes in steps S42 to S45 as described above.

The processes are performed also on a search query from another user B and the like, a search query log of search queries associated with received time together with category information, each user ID, or each IP address is generated in the search query log DB 12*a*, and a character string set group made of character strings is generated in the character string set DB 12*d*.

(4.2 Registration of Related Word)

Next, registration of a related word will be described using FIGS. 15 and 16.

Figure 15:
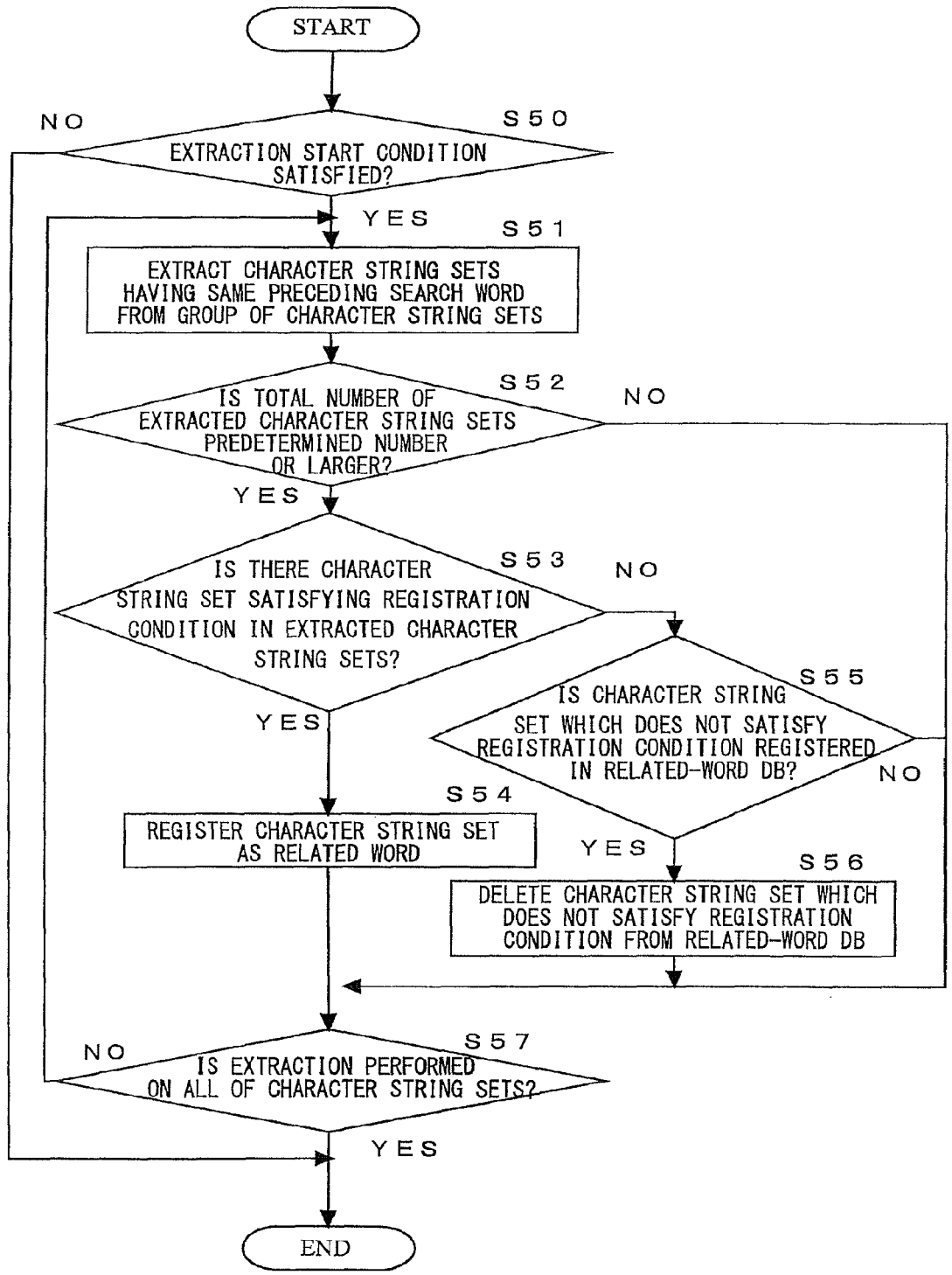
FIG. 15 is a flowchart illustrating an example of operation of registering a related word, of the related-word registration server in FIG. 1.
Figure 16:
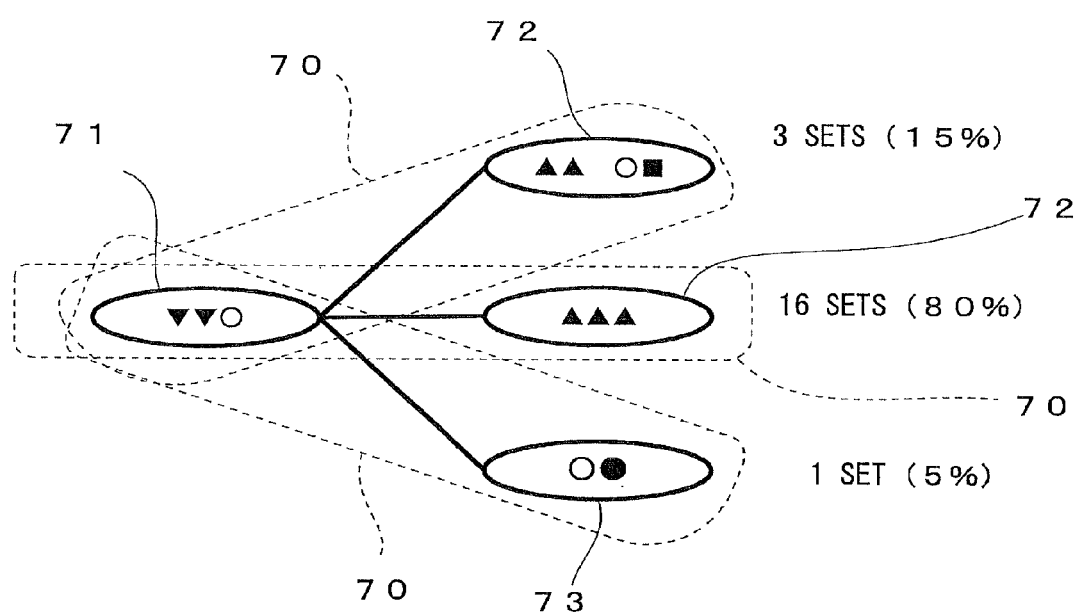
FIG. 16 is a schematic diagram illustrating an example of a character string set.

First, as illustrated in FIG. 15, the related-word registration server 10 determines whether an extraction start condition is satisfied or not (step S50). Specifically, the system control unit 14 of the related-word registration server 10 determines whether, as an example of the extraction start condition, the number of search queries (the total number of search queries) in the search query login the search query log DB 12*a* or the number of elements of the character string set group (the total number of character string set groups) stored in the character string set DB 12*d* exceeds a predetermined threshold or not. The system control unit 14 of the related-word registration server 10 may also determine whether or not predetermined time has lapsed since the character string set extraction start condition was satisfied last.

In the case where the extraction start condition is satisfied (YES in step S50), the related-word registration server 10 extracts a character string set whose search word is the same as the preceding search word from the character string set group (step S51). Specifically, as illustrated in FIG. 16, the system control unit 14 of the related-word registration server 10 extracts a character string set 70 whose search word matches a preceding search word 71 (the search words are the same) from the character string set DB 12*d*. In the case where the extraction start condition is not satisfied (NO in step S50), the related-word registering process is finished.

In addition, the system control unit 14 of the related-word registration server 10 may extract a character string set whose search word is similar to the preceding search word from the character string set DB 12*d* in accordance with the preset character string set extraction start condition. When the search words are similar to each other, it means that, for example, the value of similarity based on the distance between character strings such as the Jaro-Winkler distance or Levenshtein distance is equal to or larger than a predetermined threshold. For example, the system control unit 14 of the related-word registration server 10 also extracts a character string set having a processing search word "xxx" similar to the preceding search word 71.

As described above, the related-word registration server 10 functions as an example of a character string extracting means that extracts a character string set whose search word is the same or similar to the preceding search word from the character string set storing means in accordance with the preset character string set extraction start condition.

Next, the related-word registration server 10 determines whether the total number of extracted character string sets is equal to or larger than a predetermined number (step S52). Specifically, the system control unit 14 of the related-word registration server 10 determines whether the total number of character string sets regarding the preceding search word 71 is equal to or larger than a predetermined number (for example, three). As illustrated in FIG. 16, as character string sets regarding the preceding search word 71, there are total three sets; a character string set 70 (having the preceding search word 71-search word 71), a character string set 70 (having the preceding search word 71—a search word 72), and a character string set 70 (having the preceding search word 71—a search word 73).

In the case where the total number of extracted character string sets is equal to or larger than a predetermined number (YES in step S52), the related-word registration server 10 determines whether or not there is a character string set satisfying the registration condition in the extracted character string sets (step S53). Specifically, the system control unit 14 of the related-word registration server 10 determines whether the number of the character string sets 70 is equal to or larger than a predetermined number (for example, 10 or larger) as an example of the registration condition. As described above, the system control unit 14 of the related-word registration server 10 determines whether the number of character string sets having the same or similar search words 72, 73, and 74 in the character string sets 70 whose search words are the same as or similar to the preceding search word 71 exceeds the predetermined threshold or not. The system control unit 14 of the related-word registration server 10 specifies, as related words, a character string set exceeding the predetermined threshold. In addition, when a search word "xxx" similar to the search word 73 "xxy" exists, the system control unit 14 of the related-word registration server 10 may count it as the same character string set.

As described above, the related-word registration server 10 functions as an example of a related-word specifying means that specifies a character string set as related words from extracted character string sets on the basis of a preset registration condition. The related-word registration server 10 also functions as an example of a related-word specifying means, when the number of character string sets having the same or similar search words in a character string set whose search word is the same as or similar to a preceding search word exceeds a predetermined threshold as a registration condition, that specifies the character string set as related words.

The system control unit 14 of the related-word registration server 10 may also determine whether the ratio of character string sets having the same or similar search words in a character string set whose search word is the same or similar to the preceding search word 71 exceeds a predetermined threshold (for example, 80%) or not as an example of a registration condition.

As described above, the related-word registration server 10 functions as an example of a related-word specifying means, when the ratio of character string sets having the same or similar search words in a character string set whose search word is the same as or similar to a preceding search word exceeds a predetermined threshold as a registration condition, that specifies the character string set as related words.

Next, in the case where is the character string set satisfying the registration condition (YES in step S53), the related-word registration server 10 registers the character string set as related words (step S54). Specifically, the system control unit 14 of the related-word registration server 10 registers, as illustrated in FIG. 16, the character string set 70 having <the preceding search word 71-the search word 72> as related words in the related-word DB 12*c* since the number of the character string sets 70 having <the preceding search word 71-the search word 71> is three (15%), the number of the character string sets 70 having <the preceding search word 71-the search word 72> is 16 (80%), and the number of the character string set 70 having <the preceding search word 71-the search word 73> is one (50).

As described above, the related-word registration server 10 functions as an example of a related-word registering means that registers a specified character string set as related words.

In addition, in the case where there is no character string set satisfying the registration condition (NO in step S53), the related-word registration server 10 determines whether a character string set which does not satisfy the registration condition is registered in the related-word DB or not (step S55). Specifically, the system control unit 14 of the related-word registration server 10 determines whether the ratio of the character string sets 70 having <preceding search word-search word> already registered decreases in the character string set DB 12*d* and becomes lower than a predetermined threshold (for example, 80%). Such a thing occurs when another character string set having the same or similar preceding search word increases.

In the case where the registration condition is not satisfied (YES in step S55), the related-word registration server 10 deletes the character string set which does not satisfy the registration condition from the related-word DB (step S56). Specifically, the system control unit 14 of the related-word registration server 10 deletes the character string set which does not satisfy the registration condition in the character string sets being already registered from the related-word DB 12*c*.

After step S54, the related-word registration server 10 determines whether extraction is performed on all of the character string sets or not (step S57). Specifically, the system control unit 14 of the related-word registration server 10 determines whether or not the character string set extracting process in step S51 has been performed on all of preceding words in the character string set group in the character string set DB 12*d*. In the case where the extracting process has not been performed on all of the character string sets (NO in step S57), the system control unit 14 returns to step S11. In the case where the extracting process has been performed on all of the character string sets (YES in step S57), the related-word registering process is finished.

According to the foregoing embodiment, a search query of a search word entered by the user is received. Preceding search queries obtained earlier than the received search query are extracted from the search query log on the basis of a preset search query extraction condition. The preceding search word of the preceding search query extracted and the search word of the received search query are stored as a character string set into the character string set DB 12*d*. When the preset character string set extraction start condition is satisfied, the character string set having the search word which is the same as or similar to the preceding search word is extracted. The character string set satisfying the preset registration condition is registered as related words in the related-word DB 12*c*. In such a manner, a predetermined amount of character string sets each made by the received search query and the preceding search query based on the search query extraction condition are stored under the character string set extraction start condition, and the character string set satisfying the registration condition in the stored character string sets is registered as the related words into the related-word DB 12*c*. Therefore, the precision of the related words can be improved.

In the case where the related-word registration server 10 also stores the user identification information and a preceding search query whose user identification information matches that of the user who entered the search query is extracted as the search query extraction condition, a character string set by the same user can be generated, so that the precision of related words can be further improved.

In the case where the related-word registration server 10 extracts a preceding search query received within predetermined time since received time of the search query as the search query extraction condition, since the preceding search query which is received within predetermined time and has high relativeness can be extracted, the precision of related words can be further improved.

In the case where the related-word registration server 10 further stores category information, and a preceding search query is extracted on the basis of the category information as the search query extraction condition, search words whose categories are the same or related can be formed in a character string set, so that the precision of related words can be further improved.

When the related-word registration server 10 extracts a character string set in the case where the number of elements in a character string set group exceeds a predetermined threshold as the character string set extraction start condition, character string sets in a certain scale can be stored. Since a proper character string set can be extracted from the stored sets, the precision of related words can be further improved.

When the related-word registration server 10 registers a character string set as related words in the case where the number of character string sets having the same or similar search word exceeds a predetermined threshold in character string sets having the same or similar preceding search word as the registration condition, the high-precision character string set can be selected, and the precision of related words can be further improved.

When the related-word registration server 10 registers a character string set as related words in the case where the ratio of character string sets having the same or similar search word exceeds a predetermined threshold in character string sets having the same or similar preceding search word as the registration condition, the high-precision character string set can be selected, and the precision of related words can be further improved.

In addition, in the case where the number of search queries in the search query log DB 12*a* exceeds a predetermined threshold as the character string set extraction start condition in step S51, the related-word registration server 10 may extract a character string set. In this case, character string sets in a certain scale can be stored. Since a proper character string set can be extracted from the stored sets, the precision of related words can be further improved.

When predetermined time has lapsed since the character string set extraction start condition is satisfied in step S50, the related-word registration server 10 may extract a character string set. In this case, character string sets in a certain scale can be stored. Since a proper character string set can be extracted from the stored sets, the precision of related words can be further improved.

Further, related words may be registered by a combination of the operations of the first and second embodiments in the related-word registration system. In this case, a related-word database may be constructed in the related-word DB 12*c* so that related words in which the distance between the character strings is considered like in the operation of the first embodiment and related words in which the use order of search queries is considered like in the operation of the second embodiment can be distinguished from each other.

As a method of utilizing the related-word database, for example, in the case "xx" is entered for a search in the terminal 30, the information providing server 20 refers to a related-word database constructed by the operation in the first embodiment in the related-word DB 12*c* and displays "maybe "xxx"?" is displayed in the web page 40 as a related word as illustrated in FIG. 6. Next, in the case where "xxx" is selected and a search is conducted in the terminal 30, the information providing server 20 may refer to a related-word database constructed by the operation in the second embodiment in the related-word DB 12*c* and display "yyy?" is displayed as a related word in the web page 40.

In place of displaying related words step by step, those related words may be displayed at the same time.

The present invention is not limited to the foregoing embodiments. The embodiments are illustrative, and any component which has a substantially same configuration as the technical idea described in the scope of claims for patent in the present invention and produces similar effects is included in the technical range of the present invention.

EXPLANATION OF REFERENCE NUMERALS

1: related-word registration system
10: related-word registration server (related-word registration device)
12a: search query log DB
12b: related-word candidate DB
12c: related-word DB
12d: character string set DB
20: information providing server (information processing device)
22a: product DB
30: terminal

The invention claimed is:

1. The related-word registration device comprising:
a receiving means that receives a search query of a search word entered by the user;
a search query storing means that stores the received search queries in accordance with reception order;
a search query extracting means that extracts, from the search query storing means, a preceding search query whose reception order is earlier than that of the received search query on the basis of a preset search query extracting condition;
a character string set storing means that stores, as a character string set, a preceding search word constructing the extracted preceding search query and a search word constructing the received search query;
a character string extracting means that extracts a character string set having the search word which is the same or similar to the preceding search word from the character string set storing means in accordance with a preset character string set extraction start condition;
a related-word specifying means that specifies a character set as a related word from the extracted character string set on the basis of a preset registration condition; and
a related-word registering means that registers the specified character string set as related words into a related-word database.

2. The related-word registration device according to claim 1, wherein the search query storing means further stores user identification information, and
the search query extracting means extracts the preceding search query whose user identification information matches that of the user who entered the search query as the search query extraction condition.

3. The related-word registration device according to claim 1 or 2, wherein the search query extracting means extracts a preceding search query received within predetermined time since received time of the search query as the search query extraction condition.

4. The related-word registration device according to claim 1, wherein the search query storing means further stores category information, and
the search query extracting means extracts the preceding search query on the basis of the category information as the search query extraction condition.

5. The related-word registration device according to claim 1, wherein the character string extracting means extracts the character string set in the case where the number of search queries in the search query storing means or the number of elements of the character string set group exceeds a predetermined threshold as the character string set extraction start condition.

6. The related-word registration device according to claim 1, wherein the character string extracting means extracts the character string set in the case where predetermined time lapses since the character string set extraction start condition is satisfied.

7. The related-word registration device according to claim 1, wherein in the case where the number of character string sets having the same or similar search word or the ratio of character string sets having the same or similar search word exceeds a predetermined threshold in character string sets having the same or similar preceding search word as the registration condition, the related-word specifying means specifies the character string set as related words.

8. The related-word registration device according to claim 1, further comprising:
a related-word candidate group generating means that generates a related-word candidate group by extracting candidates of a related word on the basis of a predetermined condition from a search query log in which logs regarding a search query are stored;
a partial character string generating means that generates a partial character string from a character string of the search word;
a candidate character string extracting means that extracts a candidate character string from the related-word candidate group on the basis of the generated partial character string;
a score calculating means that calculates a suitability score of the candidate character string on the basis of similarity between the candidate character string and the search word, the number of use times of the candidate character string, and the number of search results of the search of the candidate character string;
a ranking means that ranks the candidate character strings in order of the scores;
a criterion generating means that generates a reference line of a suitability score for the ranking as a criterion of determining whether the candidate character string is registered as a related word or not on the basis of the suitability score and the ranking of the candidate character string;
a registration character string extracting means that extracts, as a registration character string to be registered as a related word, a candidate character string whose suitability score is apart from the reference line by a preset threshold or larger; and
a related-word registering means that registers the extracted registration character string and the search word as related words into a related-word database.

9. An information processing device for processing information with reference to a related-word database of the related-word registration device according to claim 1, comprising:
a related-word extracting means that extracts a related word corresponding to a search word of the received search query with reference to the related-word database; and
a related-word output means that outputs the related word extracted by the related-word extracting means.

10. A related-word registration method of a related-word registration device for registering a related word, comprising:
a receiving step of receiving a search query of a search word entered by the user;

a search query storing step of storing the received search queries in accordance with reception order in a search query storing means;

a search query extracting step of extracting, from the search query storing means, a preceding search query whose reception order is earlier than that of the received search query on the basis of a preset search query extracting condition;

a character string set storing step of storing, as a character string set, a preceding search word constructing the extracted preceding search query and a search word constructing the received search query in a character string set storing means;

a character string extracting step of extracting a character string set having the search word which is the same or similar to the preceding search word from the character string set storing means in accordance with a preset character string set extraction start condition;

a related-word specifying step of specifying a character set as a related word from the extracted character string set on the basis of a preset registration condition; and a related-word registering step of registering the specified character string set as related words into a related-word database.

\* \* \* \* \*